United States Patent
Shiiba et al.

(10) Patent No.: US 8,868,274 B2
(45) Date of Patent: Oct. 21, 2014

(54) CONTROL APPARATUS FOR VEHICULAR DRIVE SYSTEM

(75) Inventors: Kazuyuki Shiiba, Miyoshi (JP); Takeshi Kanayama, Toyota (JP); Taiyo Uejima, Toyota (JP); Daiki Sato, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 43 days.

(21) Appl. No.: 13/821,013

(22) PCT Filed: Sep. 7, 2010

(86) PCT No.: PCT/JP2010/065290
§ 371 (c)(1),
(2), (4) Date: Mar. 6, 2013

(87) PCT Pub. No.: WO2012/032605
PCT Pub. Date: Mar. 15, 2012

(65) Prior Publication Data
US 2013/0166131 A1    Jun. 27, 2013

(51) Int. Cl.
*B60W 20/00* (2006.01)
*B60W 30/19* (2012.01)
*B60K 6/365* (2007.10)
*B60K 6/445* (2007.10)
*B60L 11/14* (2006.01)
*B60W 10/115* (2012.01)
*B60W 10/02* (2006.01)
*B60W 10/06* (2006.01)
*B60W 10/08* (2006.01)
*B60W 10/11* (2012.01)
*B60W 10/12* (2012.01)

(52) U.S. Cl.
CPC ............... *B60L 11/14* (2013.01); *B60W 30/19* (2013.01); *Y02T 10/648* (2013.01); *Y02T 10/646* (2013.01); *Y02T 10/6239* (2013.01); *B60W 10/12* (2013.01); *B60W 10/11* (2013.01); *B60K 6/365* (2013.01); *B60W 20/108* (2013.01); *B60W 2600/00* (2013.01); *B60K 6/445* (2013.01); *B60W 20/00* (2013.01); *B60W 10/08* (2013.01); *Y02T 10/7258* (2013.01); *Y10S 903/93* (2013.01); *B60W 10/115* (2013.01); *Y02T 10/7077* (2013.01); *Y10S 903/909* (2013.01); *Y10S 903/91* (2013.01); *Y10S 903/911* (2013.01); *Y10S 903/917* (2013.01); *Y10S 903/945* (2013.01)
USPC .................. 701/22; 701/51; 701/55; 701/60; 701/61; 701/84; 701/87; 701/90; 701/95; 180/65.1; 180/65.265; 903/909; 903/910; 903/911; 903/917; 903/945; 903/930

(58) Field of Classification Search
CPC .......... B60K 6/445; B60K 6/48; B60K 6/547; B60K 2741/145; B60L 11/14; B60L 15/20; B60W 10/02; B60W 10/06; B60W 10/08; B60W 20/00; B60W 20/30; B60W 30/18; B60W 30/19; B60W 50/082; B60W 2510/10; B60W 2710/10; F16H 61/16; Y02T 10/6286
USPC ........... 701/22, 51, 55, 60–61, 84, 87, 90, 95; 903/909–911, 917, 945
See application file for complete search history.

(56) References Cited

U.S. PATENT DOCUMENTS

| | | | |
|---|---|---|---|
| 6,452,286 B1 * | 9/2002 | Kubo et al. ................. | 290/40 C |
| 2009/0036263 A1 * | 2/2009 | Iwase et al. ....................... | 477/3 |
| 2009/0242293 A1 * | 10/2009 | Tanaka et al. ............ | 180/65.285 |
| 2012/0310460 A1 | 12/2012 | Sato et al. | |

FOREIGN PATENT DOCUMENTS

| | | |
|---|---|---|
| JP | 2006-117206 | 5/2006 |
| JP | 2007-126075 | 5/2007 |
| JP | 2010-188794 | 9/2010 |
| WO | WO 2011/077581 A1 | 6/2011 |

OTHER PUBLICATIONS

English Language Translation of JP 2006-117206, published May 11, 2006.

English Language Translation of JP 2007-126075, published May 24, 2007.
English Language Translation of JP 2010-188794, published Sep. 2, 2010.
U.S. Appl. No. 13/532,215, filed Jun. 25, 2012.

* cited by examiner

*Primary Examiner* — James Trammell
*Assistant Examiner* — Atul Trivedi
(74) *Attorney, Agent, or Firm* — Finnegan, Henderson, Farabow, Garrett & Dunner, LLP

(57) ABSTRACT

Providing a control apparatus for a vehicular drive system, which is configured to implement a torque reduction control during a shifting action of an automatic transmission, and which permits reduction of the size and cost of an electric circuit including a smoothing capacitor.

An electricity-generation-amount-variation restricting region A01 is predetermined such that a point of a vehicle running state lies in the electricity-generation-amount-variation restricting region A01 prior to a moment of determination to perform a shifting action of the automatic transmission, and electricity-generation-amount-variation restricting means 96 implements an electricity-generation-amount-variation restricting control to restrict a rate of increase of a total amount of an electric energy generated by first and second electric motors MG1 and MG2, to a predetermined upper limit value $LT_{GN}$, when the point of the vehicle running state has moved into the electricity-generation-amount-variation restricting region A01. Accordingly, it is possible to prevent an abrupt increase of the total amount of the electric energy generated by the first and second electric motors MG1 and MG2 prior to a torque reduction control to be implemented during the shifting action of the automatic transmission 22. As a result, the amount of a surplus electric energy can be reduced, so that a required electrostatic capacity of the inverter smoothing capacitor 66 can be reduced. Namely, the size and cost of an electric power source control circuit 60 including the inverter smoothing capacitor 66 can be reduced.

5 Claims, 9 Drawing Sheets

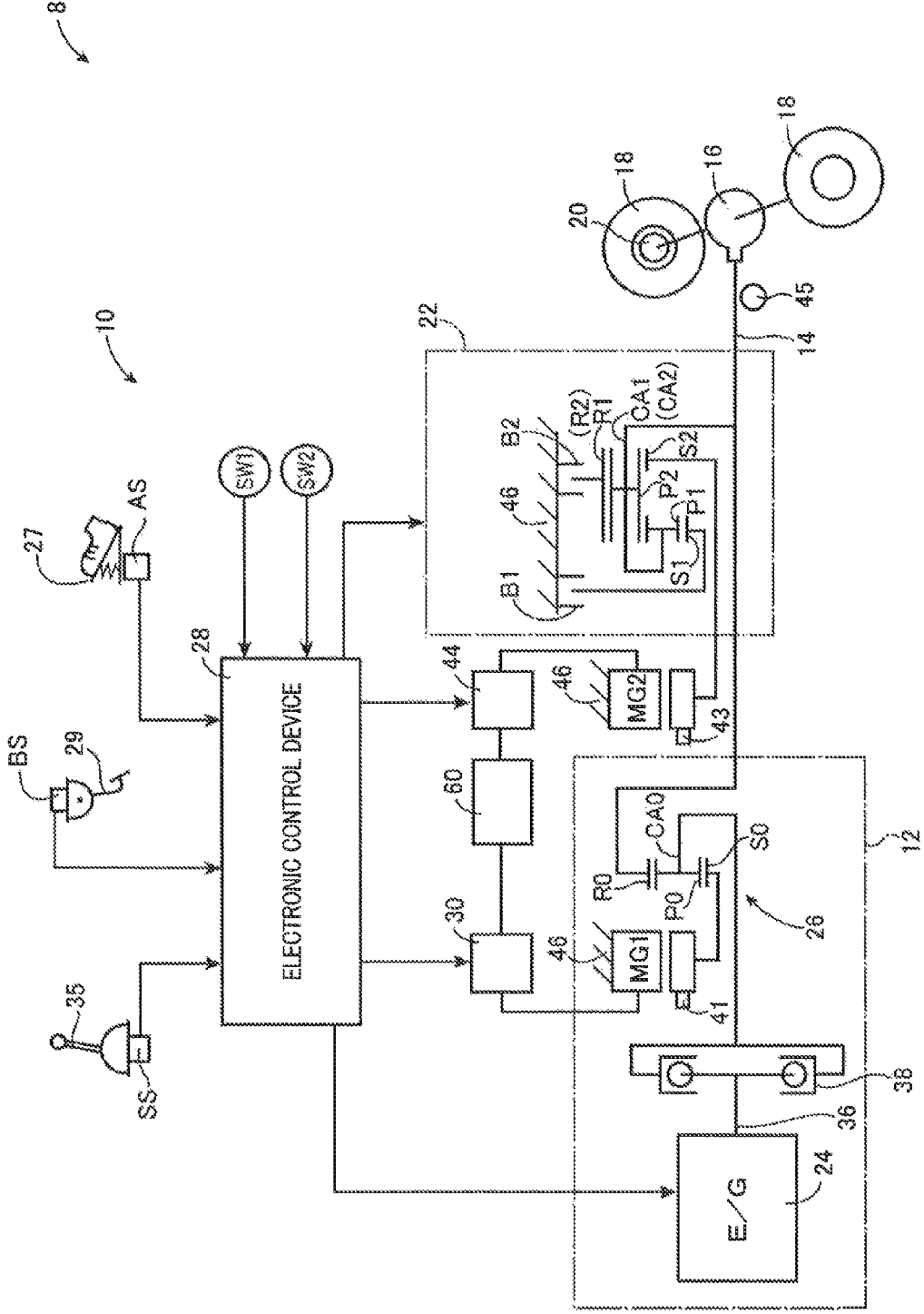

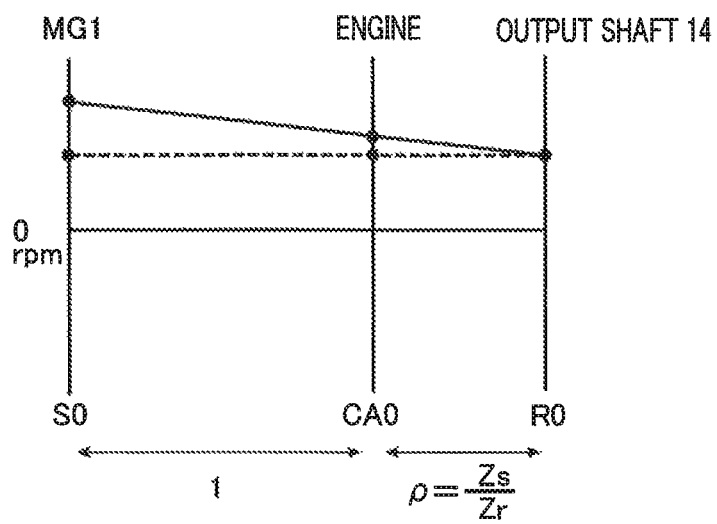

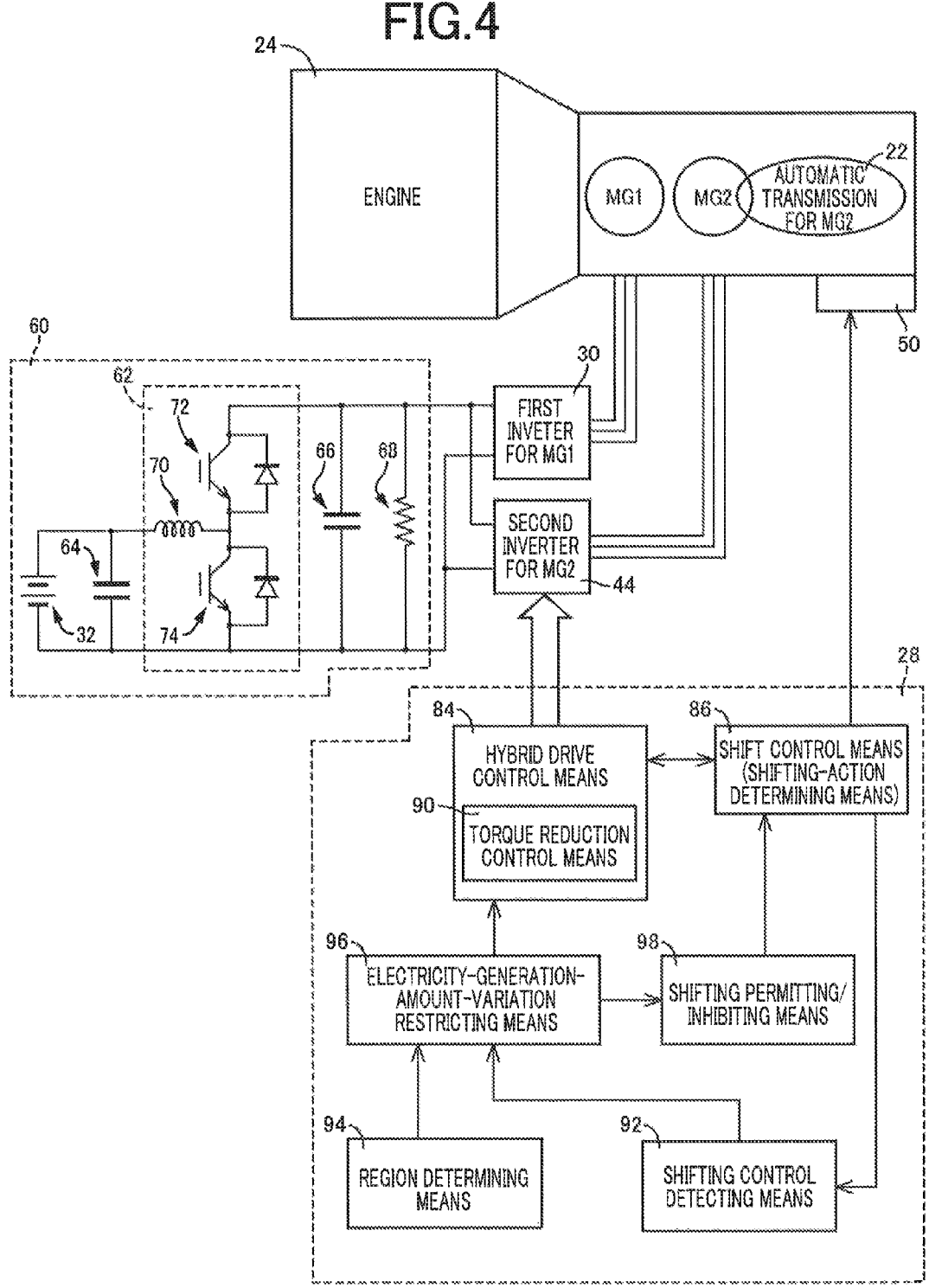

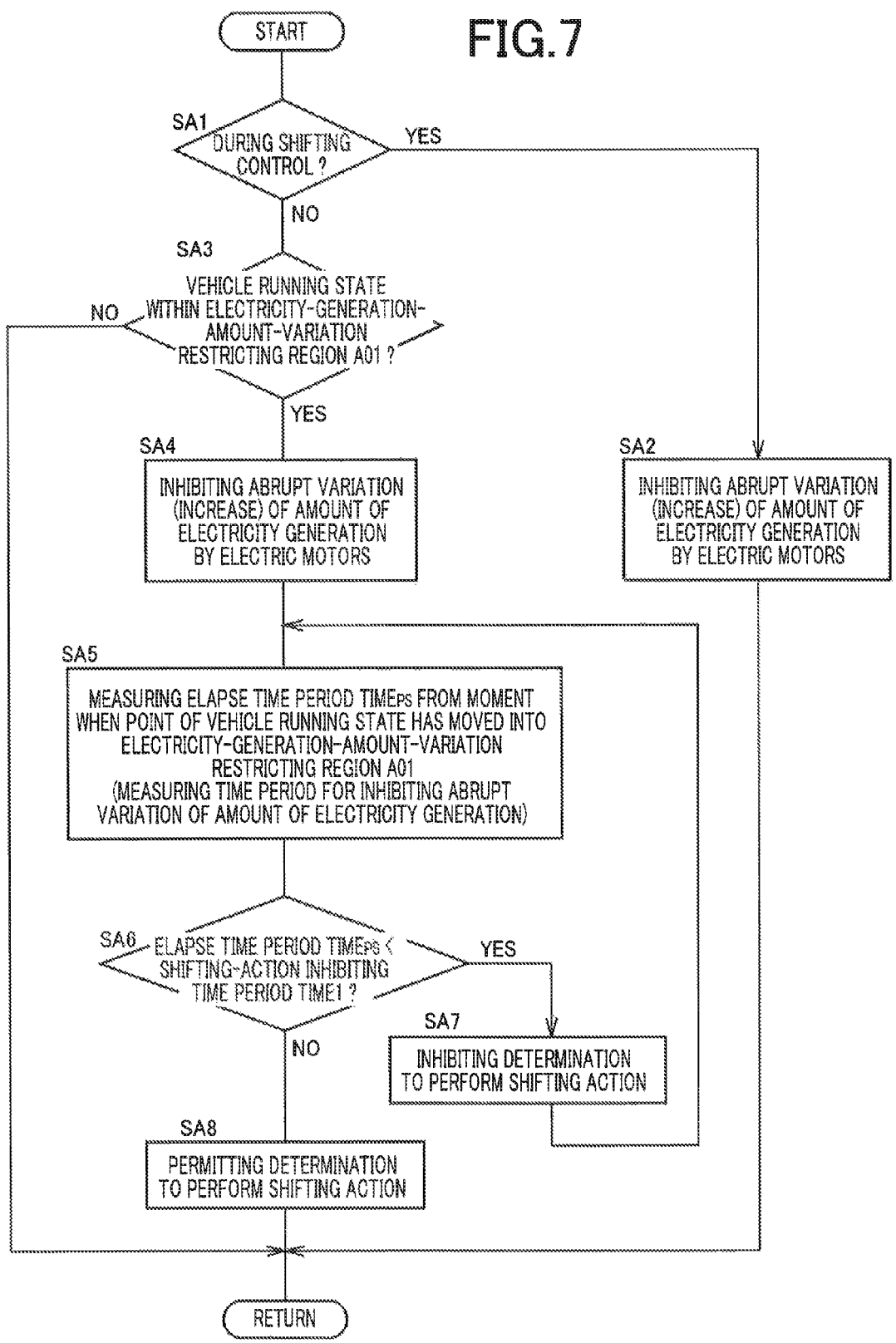

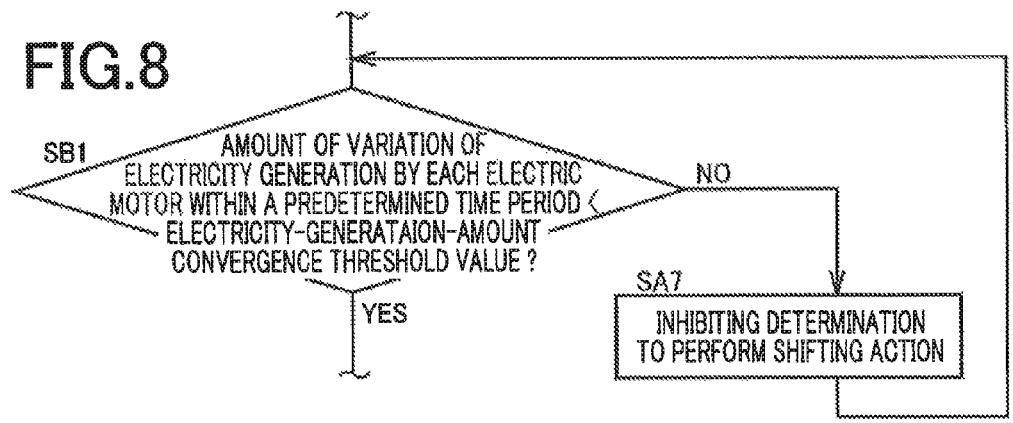
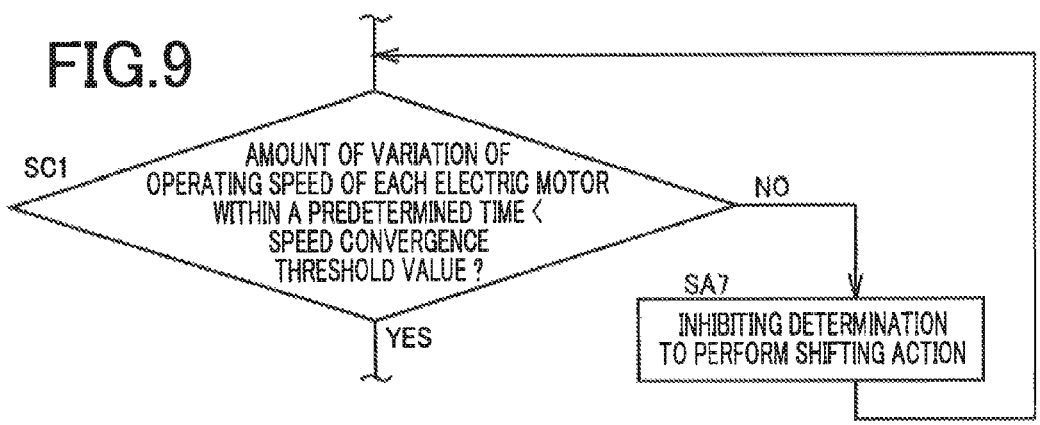
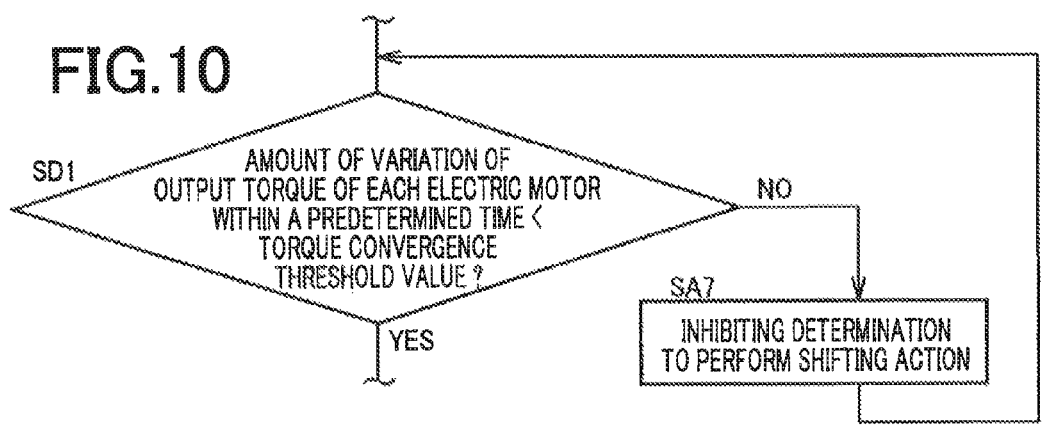

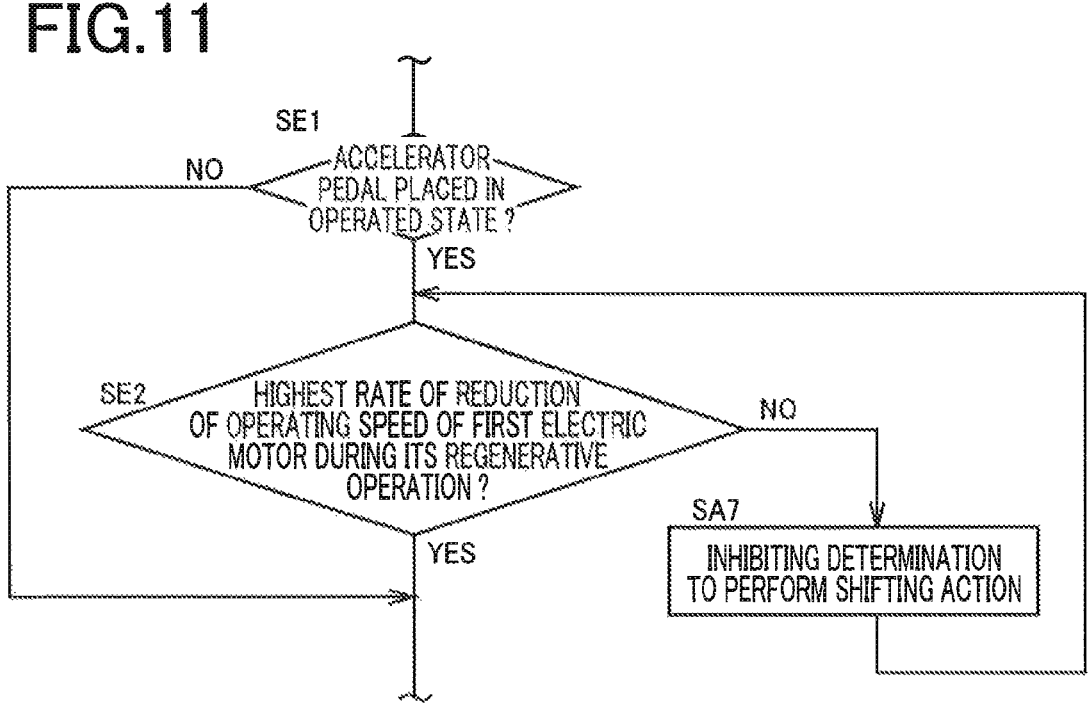

CONTROL APPARATUS FOR VEHICULAR DRIVE SYSTEM

CROSS-REFERENCE TO RELATED APPLICATIONS

This application is a national phase application of International Application No. PCT/JP2010/065290, filed Sep. 7, 2010, the content of which is incorporated herein by reference.

TECHNICAL FIELD

The present invention relates to a technique for controlling an electric motor used as a drive power source provided in a vehicle.

BACKGROUND ART

There is well known a control apparatus for a vehicular drive system provided with an electric motor used as a vehicle drive power source, and an automatic transmission constituting a part of a power transmitting path between the electric motor and vehicle drive wheels, as commonly employed in a hybrid vehicle or an electric vehicle. Patent Document 1 discloses an example of such a control apparatus for a vehicular drive system.

The control apparatus for a vehicular drive system disclosed in the Patent Document 1 is configured to control the above-indicated electric motor in control modes consisting of: a sine-wave modulation mode in which an alternating current voltage to be applied to the above-indicated electric motor is controlled so as to follow a sine wave; a hyper-modulation mode in which the alternating current voltage is controlled, so as to follow a strained sine wave; and a one-pulse mode in which the alternating current voltage is controlled so as to follow a rectangular wave. The control apparatus of this Patent Document 1 switches the control mode from one mode to another at a moment different from a moment of shifting of the above-indicated automatic transmission, for instance, after completion of a shifting action of the above-indicated automatic transmission.

In the vehicular drive system as disclosed in the Patent Document 1, an inverter is usually interposed between the above-indicated electric motor and an electric power source for the electric motor, such that the inverter is connected on its power input side to a smoothing capacitor provided to smooth an input voltage applied to the inverter. However, this arrangement is not clearly described in the Patent Document 1.

PRIOR ART DOCUMENTS

Patent Documents

Patent Document 1: JP-2006-117206 A
Patent Document 2 JP-2007-126075 A

SUMMARY OF THE INVENTION

Object Achieved by the Invention

It is well known that where the above-indicated automatic transmission is a transmission arranged to perform a clutch-to-clutch shifting operation with a releasing action of a coupling device and an engaging action of another coupling device, a torque reduction control is implemented to temporarily reduce an output torque of the above-indicated electric motor (electric motor torque) during the shifting operation of the automatic transmission, with respect to the output torque prior to initiation of the shifting operation. This torque reduction control is implemented during both of a shift-down action and a shift-up action of the automatic transmission, for reducing a shifting shock of the automatic transmission, or for preventing an excessively high operating speed of the above-indicated electric motor, for instance.

However, the above-described torque reduction control results in an abrupt decrease of the above-described electric motor torque during the shifting operation of the above-indicated automatic transmission, and the abrupt decrease of the electric motor torque causes an excessively large amount of decrease of the output of the above-indicated electric motor (electric motor output) per unit time (an excessively high rate of decrease of the electric motor output). If the torque reduction control resulting in the abrupt decrease of the electric motor output (which may be accompanied with an abrupt increase of the amount of an electric energy generated by the electric motor) takes place concurrently with an abrupt decrease of the electric motor output caused not by the shifting operation of the above-indicated automatic transmission, for example, if the shifting operation of the above-indicated automatic transmission takes place concurrently with a regenerative operation of the electric motor as a result of an abrupt braking operation, or concurrently with an abrupt change of the operating speed of the electric motor as a result of an operation of an accelerator pedal, the rate of reduction of the electric motor output is temporarily excessively increased, so that an output of an electric power output circuit for supplying an electric energy to the above-indicated inverter for the electric motor may not follow the output decrease of the electric motor (which may imply an increase of the amount of the electric energy generated by the electric motor). In this event, the amount of a surplus electric energy is temporarily excessively increased, and the surplus electric energy is stored in the above-indicated smoothing capacitor. Accordingly, the control apparatus for a vehicular drive system of the above-identified Patent Document 1 requires the smoothing capacitor to have a considerably large electrostatic capacity sufficient to store the amount of the above-indicated surplus electric energy that may be temporarily excessively increased. For this reason, it has been difficult to reduce the size and cost of an electric circuit including the smoothing capacitor. Further, it is difficult to forecast the abrupt decrease of the electric motor output caused not by the shifting operation of the above-indicated automatic transmission, which takes place in relation to a manual operation by the vehicle operator, for instance, so that it is considered preferable to take any measure for preventing the abrupt decrease of the electric motor output, before the shifting operation of the automatic transmission. However, this problem has not been publicly recognized yet.

The present invention was made in view of the background art described above. It is therefore an object of the present invention to provide a control apparatus for a vehicular drive system, which is configured to implement a torque reduction control during a shifting action of the above-described automatic transmission, and which permits reduction of the size and cost of an electric circuit including the above-described smoothing capacitor.

Means for Achieving the Object

The object indicated above is achieved according to the present invention, which provides (a) a control apparatus for a vehicular drive system provided with at least one electric motor each connected through an inverter to an electric motor power source, an inverter smoothing capacitor connected to the inverter on the side of the electric motor power source for smoothing a voltage applied from the above-described electric motor power source to the above-described inverter, and an automatic transmission which constitutes a part of a power transmitting path between a vehicle driving electric motor of the above-described at least one electric motor and vehicle drive wheels and which is shifted to one of a plurality of speed positions on the basis of a vehicle running state and according to a predetermined shifting map, the control apparatus implementing a torque reduction control to temporarily reduce an output torque of the above-described vehicle driving electric motor during a shifting action of the above-described automatic transmission, as compared with that prior to the shifting action, characterized in that (b) an electricity-generation-amount-variation restricting region is predetermined such that a point of the above-described vehicle running state lies in the electricity-generation-amount-variation restricting region prior to a moment of determination to perform the shifting action of the automatic transmission according to the above-described shifting map, and (c) an electricity-generation-amount-variation restricting control is implemented to restrict a rate of increase of a total amount of an electric energy generated by the above-described at least one electric motor, to a predetermined upper limit value, when the above-described point of the vehicle running state has moved into the above-described electricity-generation-amount-variation restricting region.

Advantages of the Invention

According to the present invention, it is possible to prevent an abrupt increase of the total amount of the electric energy generated by the above-described at least one electric motor prior to the above-described torque reduction control to be implemented during the shifting action of the above-described automatic transmission. As a result, the amount of a surplus electric energy during the above-described torque reduction control can be reduced as compared with that where the above-described electricity-generation-amount-variation restricting control was not implemented, so that the required electrostatic capacity of the above-described inverter smoothing capacitor can be reduced. Namely, the size and cost of the above-descried inverter smoothing capacitor tend to be reduced as the above-indicated required electrostatic capacity is reduced, so that the size and cost of an electric circuit including the above-described inverter smoothing capacitor can be reduced.

In a preferred form of this invention, a shifting action of the above-described automatic transmission is inhibited during a time period from a moment when the above-indicated point of the vehicle running state has moved into the above-described electricity-generation-amount-variation restricting region, up to one of: a moment when a predetermined shifting-action inhibiting time period has elapsed after the moment when the above-indicated point has moved into the above-described electricity-generation-amount-variation restricting region; a moment when an amount of variation of the electric energy generated by each of the above-described at least one electric motor within a predetermined determination time period has been reduced below a predetermined electricity-generation-amount convergence threshold value; a moment when an amount of variation of an operating speed of each of the above-described at least one electric motor within the above-described determination time period has been reduced below a predetermined speed convergence threshold value; and a moment when an amount of variation of an output torque of each of the above-described at least one electric motor within the above-described determination time period has been reduced below a predetermined torque convergence threshold value. Accordingly, the shifting action of the above-described automatic transmission will not be performed until the output variation of each of the above-described at least one electric motor has been reduced to a given threshold value, so that it is possible to more stably reduce the surplus electric energy generated during the above-indicated torque reduction control. The vehicle speed is detected on the basis of the rotating speed of the vehicle wheels detected by a vehicle speed sensor, for example, so that the vehicle speed used to determine whether a shifting action of the above-described automatic transmission should be performed or not is recognized to be abruptly raised when the vehicle wheels have slipping motions, and to be abruptly zeroed when the vehicle wheels are locked. In these cases, the determination that the shifting action should be performed may be made substantially at the same time when the point of the vehicle running state has moved into the above-indicated electricity-generation-amount-variation restricting region, since the vehicle condition on which the determination is based is recognized to be changed suddenly. Even in these cases, an abrupt increase of the total amount of the electric energy generated by the above-described at least one electric motor can be stably prevented prior to the moment of initiation of the shifting action of the above-described automatic transmission, and the surplus electric energy generated during the above-indicated torque reduction control can be reduced.

In another preferred form of the invention, the above-described vehicular drive system is provided with an engine, and a differential mechanism which constitutes a part of a power transmitting path between the above-described engine and the above-described vehicle drive wheels, and a differential state of which is controlled by controlling a differential electric motor of the above-described at least one electric motor. In this case wherein the hybrid vehicle is provided with two electric motors consisting of the above-described differential electric motor and the above-described vehicle driving electric motor, the electrostatic capacity of the above-described inverter smoothing capacitor can be reduced, and the size and cost of the electric circuit including the inverter smoothing capacitor can be reduced.

In a further preferred form of the invention, the shifting action of the above-described, automatic transmission is inhibited when the above-described point of the vehicle running state has moved into the above-described electricity-generation-amount-variation restricting region as a result of an operation of an accelerator pedal, and the inhibition of the shifting action of the above-described automatic transmission is cancelled, and the shifting action of the above-described automatic transmission is permitted, at a point of time after a moment when a rate of reduction of operating speed of the above-described differential electric motor during regeneration of the above-described differential electric motor has become highest after the above-described point of the vehicle running state has moved into the above-described electricity-generation-amount-variation restricting region. In this case, the shifting action of the above-described automatic transmission is permitted only after the output variation of the above-described differential electric motor has been reduced to a given threshold value, so that it is possible to more stably reduce the surplus electric energy generated during the above-indicated torque reduction control. Further, since the operating speed of the differential electric motor can be easily detected by a rotary speed sensor, the point of time at which the shifting action of the above-described automatic transmission is permitted can be easily determined according to the operating state of the above-described differential electric motor.

In a still further preferred form of the invention, (a) the above-described shifting map defines a shift-up boundary line for determination of shifting up the above-described automatic transmission when the above-described point of the vehicle running state has moved across the shift-up boundary line from a low vehicle speed area into a high vehicle speed area, and a shift-down boundary line for determination of shifting down the above-described automatic transmission when the above-described point of the vehicle running state has moved across the shift-down boundary line from the high vehicle speed area into the low vehicle speed area, and (b) the above-described electricity-generation-amount-variation restricting area consists of one or both of: a region located adjacent to and on a lower vehicle-speed side of the above-described shift-up boundary line; and a region located adjacent to and on a higher vehicle-speed side of the above-described shift-down boundary line. In this case, the above-described electricity-generation-amount-variation restricting region can be set with respect to the shifting map commonly used for controlling the shifting operation of the automatic transmission.

In a yet further preferred form of the invention, the above-described electricity-generation-amount-variation restricting control is implemented also during the shifting action of the above-described automatic transmission, so that an abrupt increase of the total amount of electric energy generated by the above-described at least one electric motor can be prevented also during the shifting action of the automatic transmission.

In still another preferred form of the invention, (a) the above-described vehicle running state on which the determination as to whether the above-described automatic transmission should be shifted or not is made is represented by an operation amount of an accelerator pedal, and a running speed of the vehicle, and (b) the above-described electricity-generation-amount-variation restricting region is not provided in an area in which the operating amount of the accelerator pedal is smaller than a predetermined lower limit value. In this case, it is possible to minimize a possibility of an abrupt increase of the amount of electric energy generated by the electric motor of the above-described at least one electric motor, together with a small output of the drive wheels in the area of the small accelerator pedal operation amount, and therefore possible to reduce the frequency of unnecessary restriction of increase of the amounts of electric energy generated by the electric motor, as compared with that where the electricity-generation-amount-variation restricting region is provided so as to cover the entire range of the accelerator pedal operation amount.

BRIEF DESCRIPTION OF THE DRAWINGS

FIG. 1 is a schematic view for explaining a vehicular drive system used for a hybrid vehicle, to which the present invention is applicable;

FIG. 2 is a collinear chart representing relative rotating speeds of rotary elements of a planetary gear set functioning as a power distributing mechanism in the vehicular drive system of FIG. 1;

FIG. 3 is a table indicating engaging and releasing actions of coupling elements of an automatic transmission provided in the vehicular drive system of FIG. 1;

FIG. 4 is a schematic view showing an arrangement of an electric power source control circuit for supplying electric energies to a first electric motor and a second electric motor which are provided in the vehicular drive system of FIG. 1, and is a functional block diagram for explaining major control functions of an electronic control device;

FIG. 7 is a flow chart for explaining a major control operation of the electronic control device shown in FIG. 1, namely, an electricity-generation-amount-variation restricting control operation to temporarily inhibit a shifting action of the automatic transmission;

FIG. 8 is a flow chart corresponding to that of FIG. 7, illustrating another embodiment of the invention, wherein steps SA5 and SA6 of FIG. 7 are replaced by another step;

FIG. 9 is a flow chart corresponding to that of FIG. 7, illustrating a further embodiment of the invention, wherein the steps SA5 and SA6 of FIG. 7 are replaced by another step;

FIG. 10 is a flow chart corresponding to that of FIG. 7, illustrating a still further embodiment of the invention, wherein the steps SA5 and SA6 of FIG. 7 are replaced by another step;

FIG. 11 is a flow chart corresponding to that of FIG. 7, illustrating a yet further embodiment of the invention, wherein the steps SA5 and SA6 of FIG. 7 are replaced by another step;

MODE FOR CARRYING OUT THE INVENTION

Figure 5:
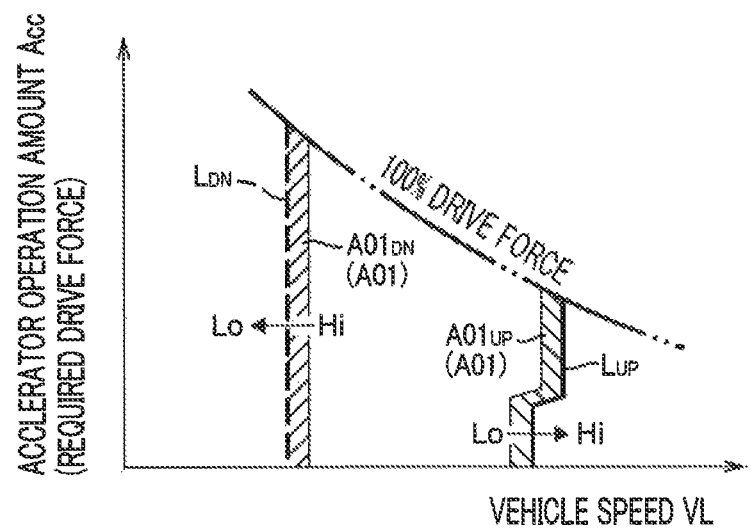
FIG. 5 is a predetermined shifting map which is used for determining a shifting action of the automatic transmission in the vehicular drive system of FIG. 1, on the basis of a vehicle speed and an operation amount of an accelerator pedal, and is a view indicating electricity-generation-amount-variation restricting regions which are provided adjacent to a shift-up boundary line and a shift-down boundary line and in which an abrupt increase of an amount of an electric energy to be generated by each of the electric motors is restricted.

Embodiments of the present invention will be described in detail by reference to the drawings.

Embodiments

FIG. 1 is the schematic view for explaining a vehicular drive system 10 (hereinafter referred to as "drive system 10") used for a hybrid vehicle 8 (hereinafter referred to as a "vehicle 8"), to which the present invention is applicable. As shown in FIG. 1, the drive system 10 is provided with a primary vehicle drive power source in the form of a first drive power source 12, a wheel-side output shaft 14 (hereinafter referred to as a "output shaft 14") functioning as an output member, a differential gear device 16, a second electric motor MG2, and an automatic transmission 22. In the vehicle 8, the drive system 10 is configured to transmit a torque of the first drive power source 12 to the output shaft 14, and to transmit the torque from the output shaft 14 to a pair of right and left drive wheels 18 through the differential gear device 16. The drive system 10 is further configured such that the second electric motor MG2 is operatively connected to the output shaft 14 through the automatic transmission 22, so that the second electric motor MG2 is controllable to selectively implement a vehicle driving control for providing a vehicle drive force, or a regenerative control for recovering an energy. Accordingly, an output torque of the second electric motor MG2 to be transmitted to the output shaft 14 can be increased and reduced according to a speed ratio γs of the automatic transmission 22 (=an operating speed Nmg2 of the second electric motor MG2/a rotating speed Nout of the output shaft 14).

The automatic transmission 22, which constitutes a part of a power transmitting path between the second electric motor MG2 (corresponding to a vehicle driving electric motor provided according to the present invention) and the output shaft 14 (drive wheels 18), has a plurality of speed positions having the respective speed ratios γs higher than "1". In the vehicle driving control in which the second electric motor MG2 outputs a torque, the automatic transmission 22 can increase the torque of the second electric motor MG2 before the torque is transmitted to the output shaft 14, so that the required capacity and size of the second electric motor MG2 can be reduced. In this arrangement, the speed ratio γs of the automatic transmission 22 is reduced to reduce the operating speed of the second electric motor MG2 (hereinafter referred to as the "second electric motor speed") Nmg2 when the rotating speed Nout of the output shaft 14 (hereinafter referred to as the "output shaft speed Nout") is increased due to a rise of the vehicle speed, or the speed ratio γs is increased to increase the second electric motor speed Nmg2 when the output shaft speed Nout is reduced, so that the operating efficiency of the second electric motor MG2 is kept sufficiently high.

The above-indicated first drive power source 12 is principally constituted by a primary vehicle drive power source in the form of an engine 24, the first electric motor MG1, and a power distributing mechanism (differential mechanism) in the form of a planetary gear set 26 configured to synthesize and distribute torques between the engine 24 and the first electric motor MG1. The above-indicated engine 24 is a known internal combustion engine such as a gasoline or diesel engine operated to produce a drive force by combustion of a fuel. An angle of opening of a throttle valve, an intake air quantity, an amount of supply of the fuel, an ignition timing and other operating conditions of the engine 24 are electrically controlled by an electronic control device 28 which is principally constituted by a microcomputer and which functions as an engine control unit (E-ECU).

The above-indicated first electric motor MG1 (corresponding to a differential electric motor provided according to the present invention) is a synchronous electric motor, for example, and is operable to selectively function as an electric motor for generating a vehicle drive torque, and as an electric generator. The first electric motor MG1 is connected to an electric-energy storage device 32 (shown in FIG. 4) through a first inverter 30. The above-indicated electronic control device 28 also functions as a motor generator control unit (MG-ECU), and controls the first inverter 30 so as to regulate an output torque and a regenerative torque of the first electric motor MG1. In the present embodiment, the first electric motor MG1 and the second electric motor MG2 correspond to at least one electric motor of the present invention connected to the electric-energy storage device (electric motor power source) 32 connected to the inverter 30 and an inverter 44.

The above-indicated, planetary gear set 26 is a planetary gear mechanism of a single-pinion type which performs a known differential function and which includes three rotary elements consisting of a sun gear S0; a ring gear R0 disposed coaxially with the sun gear S0; and a carrier CA0 which supports a pinion gear P0 meshing with the sun gear S0 and the ring gear R0, such that the pinion gear P0 is rotatable about its axis and an axis of the planetary gear set 26. The planetary gear set 26 is disposed coaxially with the engine 24 and the automatic transmission 22. Since each of the planetary gear set 26 and the automatic transmission 22 is symmetrical in construction with respect to its axis, a lower half of the planetary gear set 26 and automatic transmission 22 is not shown in FIG. 1.

In the present embodiment, a crankshaft 36 of the engine 24 is connected to the carrier CA0 of the planetary gear set 26 through a damper 38. On the other hand, the first electric motor MG1 is connected to the sun gear S0, and the output shaft 14 is connected to the ring gear R0. The carrier CA0 functions as an input element, and the sun gear S0 functions as a reaction element, while the ring gear R0 functions as an output element.

The collinear chart of FIG. 2 represents the relative rotating speeds of the rotary elements of the single-pinion type planetary gear set 26 which functions as the differential mechanism. In this collinear chart, the rotating speeds of the sun gear S0, carrier CA0 and ring gear R0 are taken along respective vertical axes S0, CA0 and R0. A distance between the vertical axes CA0 and R0 is equal to ρ (number Zs of teeth of the sun gear S0/number Zr of teeth of the ring gear R0) where a distance between the vertical axes S0 and CA0 is equal to "1".

In the planetary gear set 26 described above, the ring gear 110 functioning as the output element receives a directly transmitted torque when the first electric motor MG1 applies a reaction torque to the sun gear S0 while the output torque of the engine 24 is transmitted to the carrier CA0, so that the first electric motor MG1 functions as the electric generator. Further, an operating speed Ne of the engine 24 (hereinafter referred to as an "engine speed Ne") can be varied continuously, namely, without a stepping change, according to a change of an operating speed Nmg1 of the first electric motor MG1 (hereinafter referred to as a "first electric motor speed Nmg1") while the rotating speed of the ring gear R0, namely, the output shaft speed Nout is kept constant. A broken line in FIG. 2 indicates a decrease of the engine speed Ne when the first electric motor speed Nmg1 is reduced from a value indicated by a solid line. Accordingly, the engine speed Ne can be controlled for maximum fuel economy, by controlling the first electric motor MG1. This kind of hybrid control is referred to as a mechanical distribution type or a split type. It will be understood from the foregoing description that the differential state of the planetary gear set 26 can be electrically controlled by the first electric motor MG1.

Referring back to FIG. 1, the automatic transmission 22 constitutes a power transmitting path between the second electric motor MG2 and the drive wheels 18, and is a step-variable transmission which is placed in a selected one of a plurality of speed positions (operating positions) Hi and Lo, on the basis of the running state of the vehicle and according to a predetermined shifting map as shown in FIG. 5. Described more specifically, the automatic transmission 22 is constituted by a first brake B1, a second brake B2, and a planetary gear mechanism of a Ravigneaux type. Namely, the automatic transmission 22 has a first sun gear S1, a second sun gear S2, a stepped pinion P1 meshing with the first sun gear S1, a pinion P2 meshing with the stepped pinion P1, and a ring gear R1 (R2) which meshes with the pinion P2 and which is disposed coaxially with the above-indicated sun gears S1, S2. The above-indicated pinions P1, P2 supported by a common carrier CA1 (CA2) such that each of the pinions P1, P2 is rotatable about its axis and about an axis of the automatic transmission 22. Further, the second sun gear S2 meshes with the pinion P2.

Like the first electric motor MG1, the above-indicated second electric motor MG2 is a synchronous electric motor, for instance, and is operable to selectively function as an electric motor for generating a vehicle drive torque, and as an electric generator. The second electric motor MG2 is connected to the electric-energy storage device 32 (shown in FIG. 4) through the second inverter 44. The second electric motor MG2 is controlled by the electronic control device 28 functioning as the motor generator control unit (MG-ECU) through the second inverter 44, to function as the electric motor or the electric generator, for regulating an assisting output torque and a regenerative torque. The second electric motor MG2 is connected to the second sun gear S2, and the above-indicated carrier CA1 is connected to the output shaft 14. The first sun gear S1 and the ring gear R1 cooperate with the pinions P1 and P2 to constitute a mechanism equivalent to a planetary gear set of a double-pinion type, while the second sun gear 52 and the ring gear R1 cooperate with the pinion P2 to constitute a mechanism equivalent to a planetary gear set of a single-pinion type.

In the automatic transmission 22, the first brake B1 is disposed between the sun gear S1 and a stationary member in the form of a housing 46, to selectively fix the sun gear S1 to the housing 46, and the second brake B2 is disposed between the ring gear R1 and the housing 46, to selectively fix the ring gear R1 to the housing 46. These brakes B1, B2 are so-called frictional coupling devices configured to generate a braking force based on a friction force, and may be coupling devices of a multiple-disc type or a band type. The torque capacities of the brakes B1, B2 are variable according to their engaging pressures generated by respective brake B1 and B2 hydraulic actuators such as hydraulic cylinders.

In the automatic transmission 22 constructed as described above, the sun gear S2 functions as an input element, and the carriers CA1 and CA2 function as an output element. As indicated in the table of FIG. 3, the automatic transmission 22 is placed in the high-speed position Hi having a speed ratio γsh higher than "1" when the first brake B1 is engaged while the second brake B2 is released, and placed in the low-speed position Lo having a speed ratio γsl higher than the speed ratio γsh of the high-speed position Hi, when the second brake B2 is engaged while the first brake B1 is released. That is, the automatic transmission 22 is a step-variable transmission having the two speed positions and arranged to perform a clutch-to-clutch shifting operation with a releasing action of the releasing-side coupling device and an engaging action of the engaging-side coupling device. One of the speed positions Hi and Lo is selected on the basis of the vehicle running state as represented by the vehicle speed. VL and the required vehicle drive force (or the accelerator pedal operation amount Acc). Described more specifically, one of the speed positions is selected on the basis of the detected vehicle running state, and according to the predetermined shifting map defining regions of the speed positions. The above-described electronic control device 28 also functions as a transmission control unit (T-ECU) for controlling the shifting operation of the automatic transmission 22.

As described above, the speed ratios γsl and γsh are both higher than "1" so that the output torque Tmg2 of the second electric motor MG2 is amplified according to the speed ratio of the currently established fixed speed position Lo or Hi, and the thus amplified torque is transmitted to the output shaft 14. In the process of a shifting action of the automatic transmission 22, however, the torque transmitted to the output shaft 14 is influenced by an inertia torque caused by a variation of the torque capacity and the rotating speed of each of the brakes B1, B2. The torque transmitted to the output shaft 14 is a positive torque when the second electric motor MG2 is placed in an operated state, and a negative torque when the second electric motor MG2 is placed in a non-operated state. The non-operated state of the second electric motor MG2 is a state in which the second electric motor MG2 is driven by a rotary motion of the output shaft 14 transmitted through the automatic transmission 22 thereto. The operated and non-operated states of the second electric motor MG2 do not necessarily correspond to the driving and non-driving states of the vehicle.

As shown in FIG. 1, each of the drive wheels 18 is provided with a wheel braking device 20, which is a well known disc brake device or a drum brake device arranged to brake the rotating drive wheels 18 with a braking force corresponding to a force of depression acting on a brake pedal 29. When a regenerative braking torque generated by a regenerative operation of the second electric motor MG2 is applied to each drive wheel 18, the braking force of the wheel braking device 20 and a regenerative braking force based on the above-indicated regenerative braking torque are controlled so that a sum of the regenerative brake force and the braking force of the wheel braking device 20 corresponds to the depression force of the brake pedal 29. It is noted that the driven wheels of the vehicle 8 are also provided with the wheel braking devices 20 not shown in FIG. 1.

As described above, the above-described electronic control device 28 functions as the engine control unit (E-ECU) for controlling the engine 24, the motor generator control unit (MG-ECU) for controlling the first electric motor MG1 and the second electric motor MG2, and the transmission control unit (T-ECU) for controlling the automatic transmission 22. The electronic control device 28 receives an output signal of a first electric motor speed sensor 41 such as a resolver indicative of the first electric motor speed Nmg1, an output signal of a second electric motor speed sensor 43 such as a resolver indicative of the second electric motor speed Nmg2, an output signal of an output shaft speed sensor 45 indicative of the output shaft speed Nout corresponding to a vehicle speed VL, an output signal of a hydraulic switch SW1 indicative of a hydraulic pressure PB1 of the first brake B1 (hereinafter referred to as a "first brake hydraulic pressure PB1"), an output signal of a hydraulic switch SW2 indicative of a hydraulic pressure PW2 of the second brake B2 (hereinafter referred to as a "second brake hydraulic pressure PB2"), an output signal of a position sensor SS indicative of a selected position of a shift lever 35, an output signal of an accelerator pedal operation amount sensor AS indicative of the operation amount of an accelerator pedal 27 (hereinafter referred to as the "accelerator pedal operation amount Acc") and corresponding to the required driving force of the driver, and an output signal of a brake sensor BS indicating whether the brake pedal 29 is in the operated position or not. The electronic control device 28 also receives output signals of other sensors, such as: a signal indicative of a charging or discharging current Icd of the electric-energy storage device 32 (hereinafter referred to as a "charging/discharging current Icd" or "input/output current Icd."); a signal indicative of a voltage Vbat of the electric-energy storage device 32; a signal indicative of an electric energy amount (charging state) SOC of the electric-energy storage device 32; a signal indicative of a supply current Img1 applied from the first inverter 30 to the first electric motor MG1, which corresponds to the output torque Tmg1 or regenerative torque of the first electric motor MG1; and a signal indicative of a supply current Img2 applied from the second inverter 44 to the second electric motor MG2, which corresponds to the output torque Tmg2 or regenerative torque of the second electric motor MG2.

FIG. 4 is the schematic view showing an arrangement of an electric power source control circuit 60 for supplying the electric energies to the first electric motor MG1 and the second electric motor MG2, and is the functional block diagram for explaining major control functions of the electronic control device 28.

The drive system 10 is also provided with the electronic control device 28, the first inverter 30, the second inverter 44, and an electric power source control circuit 60. As shown in FIG. 4, the electric power source control circuit 60 is connected to each of the first inverter 30 and the second inverter 44, and is provided with the electric-energy storage device 32 (corresponding to an electric motor power source provided according to this invention), a voltage converter 62, a storage-device side smoothing capacitor 64 on the side of the electric-energy storage device, an inverter side smoothing capacitor 66 (corresponding to an inverter smoothing capacitor provided according to this invention, which is hereinafter referred to as the "inverter smoothing capacitor"), and a discharging resistor 68. The first inverter 30 and the second inverter 44 correspond to inverters provided according to this invention.

The electric-energy storage device 32 is capable of supplying and receiving an electric energy to and from each of the first electric motor MG1 and the second electric motor MG2, and is a chargeable and dischargeable secondary battery such as a lithium ion assembled battery or a nickel hydrogen assembled battery. The electric-energy storage device 32 may be a condenser or a capacitor, for example.

The voltage converter 62 is provided with a reactor 70 and two switching elements 72 and 74, and is a voltage raising and lowering circuit configured to raise the voltage on the side of the electric-energy storage device 32 and supply the raised voltage to the inverters 30, 44 during vehicle driving operations of the electric motors, and to lower the voltage on the side of the inverters 30, 44 and supply the lowered voltage to the electric-energy storage device 32 during regenerative operations of the electric motors. A positive pole bus and a negative pole bus of the voltage converter 62 are connected to respective positive and negative generators of each of the two inverters 30, 44.

The reactor 70 is connected at one of its opposite ends to a positive pole bus of the electric-energy storage device 32, and at the other end to a point of series connection of the two switching elements 72, 74, and is a device configured to store a magnetic energy. The reactor 70 consists of a magnetic core and a coil wound on the magnetic core, and is utilized as an inductance when a high-frequency wave signal is applied to the coil. The reactor 70 cooperates with the switching elements 72, 74 to constitute the voltage raising and lowering circuit.

The two switching elements 72, 74 are high-power switching transistors connected in series with each other and disposed between the positive and negative pole buses of the inverters 30, 44. The point of series connection of the two switching elements 72, 74 is connected to the above-indicated other end of the reactor 70. For instance, each switching element 72, 74 is a bi-polar transistor of a gate insulating type. While the switching elements 72, 74 are of an n-channel type in the example of FIG. 4, the switching elements 72, 74 may be of a p-channel type according to the electrical potential of the electrical circuit. Each of the two switching elements 72, 74 is provided with a diode in parallel connection with each other.

One of the two switching elements 72, 74, namely, the switching element 72 is connected at its collector terminal to the positive pole buses of the inverters 30, 44, at its emitter terminal to the collector terminal of the other switching element 74, and at its gate terminal serving as the control terminal to a control signal line originating from the electronic control device 28. The other switching element 74 is connected at its collector terminal to the switching element 72, as indicated above, at its emitter terminal to the negative pole generators common to the electric-energy storage device 32 and the inverters 30, 44, and at its gate terminal serving as the control terminal to the control signal line originating from the electronic control device 28.

When the voltage converter 62 performs a voltage raising operation, for instance, the switching element 72 is placed in of state and the switching element 74 is placed in a switching state in which the switching element 74 is repeatedly turned on and off. In this switching state, the switching element 74 is cyclically turned on and off several hundred thousands times per second. In the switching state of the switching element 74, when the switching element 74 is in on state, the above-indicated other end of the reactor 70 is connected to the negative pole buses, and an electric current flows through the reactor 70, so that an electric energy is stored in the reactor 70. At the moment when the switching element 74 is turned from its on state to its off state, the electric energy stored in the reactor 70 is discharged therefrom, so that the voltage at the above-indicated other end of the reactor 70 is raised. Consequently, when the voltage at the above-indicated other end of the reactor 70 which is connected to the inverter smoothing capacitor 66 through the diode in parallel connection with the switching element 72 becomes higher than a terminal voltage Vcon of the inverter smoothing capacitor 66 (hereinafter referred to as the "smoothing capacitor voltage Vcon"), the inverter smoothing capacitor 66 is charged, and the smoothing capacitor voltage Vcon is raised. Thus, the smoothing capacitor voltage Vcon, that is, the secondary side voltage is raised when the switching element 74 is repeatedly turned on and off. When the voltage on the secondary side has been raised to a predetermined reference value, the switching element 74 is held in its off state by a control circuit not shown. When the voltage on the secondary side has been lowered below the reference value, on the other hand, the switching element 74 is placed in its switching state described above. Thus, the voltage raising operation performed by the voltage converter 62 as described above may not follow an abrupt variation of a load on the secondary side. If the amount of electric power consumption by the inverters 30, 44 is abruptly reduced by a large degree, for example, the switching operation of the switching element 74 from its switching state to its off state may be delayed, with a result of a temporary rise of the above-indicated voltage on the secondary side.

The storage-device side smoothing capacitor 64 is disposed between the electric-energy storage device 32 and the voltage converter 62, in parallel connection with the electric-energy storage device 32, and functions to restrict a variation of the voltage of the voltage converter 62 on its lower-voltage side, that is, on the side of the electric-energy storage device 32.

The inverter smoothing capacitor 66 is disposed between the inverters 30, 44 and the voltage converter 62, in parallel connection with the inverters 30, 44, and functions to restrict a variation (pulsation) of the voltage of the voltage converter 62 on its high-voltage side, that is, on the side of the inverters 30, 44. In other words, the inverter smoothing capacitor 66 is a capacitor connected to the terminals of the inverters 30, 44 on the side of the electric-energy storage device 32, for smoothing the voltage to be applied from the electric-energy storage device 32 to the inverters 30, 44, namely, the voltage applied from the voltage converter 62 to the inverters 30, 44.

The discharging resistor 68 is a resistive element used to discharge the electric energy stored in the inverter smoothing capacitor 66 when the operation of the electric power source control circuit 60 is terminated.

Then, the major control functions of the electronic control device 28 will be described by reference to FIG. 4. As shown in FIG. 4, the electronic control device 28 is provided with a hybrid drive control portion in the form of hybrid drive control means 84, a shift control portion in the form of shift control means 86, a shifting control detecting portion in the form of shifting control detecting means 92, a region determining portion in the form of region determining means 94, an electricity-generation-amount-variation restricting portion in the form of electricity-generation-amount-variation restricting means 96, and a shifting permitting/inhibiting portion in the form of shifting permitting/inhibiting means 98. The hybrid drive control means 84 is configured to calculate a vehicle output required by the vehicle operator on the basis of the accelerator pedal operation amount Acc, when a power switch is turned on to start up the hybrid drive control means 84 with the brake pedal placed in the operated state after a key is inserted into a key slot, for instance. The hybrid drive control means 84 controls the engine 24 and/or the second electric motor MG2 to provide the calculated required vehicle output, so as to drive the vehicle with a high degree of fuel economy and a minimum amount of exhaust emissions. For example, the hybrid drive control means 84 selects one of a motor drive mode, a battery charging drive mode, and an engine drive mode, depending upon the vehicle running state. In the motor drive mode, only the second electric motor MG2 is used as the vehicle drive power source, with the engine 24 kept at rest. In the battery charging drive mode, the second electric motor MG2 is used as the vehicle drive power source while the first electric motor MG1 is operated as the electric generator by the drive force produced by the engine 24. In the engine drive mode, the vehicle is run with the drive force of the engine 24 mechanically transmitted to the drive wheels 18.

The above-described hybrid drive control means 84 controls the engine speed. Ne by controlling the first electric motor MG1, such that the engine 24 operates so as to follow a predetermined operating curve such as a highest-fuel-economy curve, for instance. Where the second electric motor MG2 is operated to provide an assisting torque, the hybrid drive control means 84 commands the automatic transmission 22 to be placed in the low-speed position Lo to increase the torque to be transmitted to the output shaft 14, while the vehicle speed VL is relatively low, and to be placed in the high-speed position Hi to reduce the second electric motor speed Nmg2 for thereby reducing an energy loss, while the vehicle speed VL is relatively high. Thus, the hybrid drive control means 84 permits an efficient torque assisting operation of the second electric motor MG2. When the vehicle is run in a coasting mode, the hybrid drive control means 84 controls the second electric motor MG2 to perform a regenerative operation with an inertial energy of the coasting vehicle, so that the regenerated electric energy is stored in the electric-energy storage device 32.

When the vehicle is run in the backward direction, the hybrid drive control means 84 commands the automatic transmission 22 to be placed in the low-speed position Lo, for example, and to control the second electric motor MG2 to be operated in the reverse direction. In this case, the first electric motor MG1 of the first drive power source 12 is held in its free state, to enable the output shaft 14 to be rotated in the reverse direction irrespective of the operating state of the engine 24.

An example of the control by the hybrid drive control means 84 in the above-described engine drive mode will be described in more detail. The hybrid drive control means 84 commands the engine 24 to operate in an operating area of high efficiency, and optimizes a distribution of the drive forces to be generated by the engine 24 and the second electric motor MG2, and a reaction force generated by the first electric motor MG1 operated as the electric generator for improving running performance and/or fuel efficiency.

For instance, the hybrid drive control means 84 determines a target drive-force-related value, for example, a required output shaft torque TR (corresponding to the required vehicle drive torque), on the basis of the operated required vehicle output in the form of the accelerator pedal operation amount Acc, and the vehicle speed VL, and according to a stored drive force map. The hybrid drive control means 84 calculates a required output shaft power on the basis of the determined required output shaft torque TR, while taking account of a required amount of charging of the electric-energy storage device, and then calculates a target engine power to obtain the calculated required output shaft power, while taking account of a power transmission loss, loads acting on various optional devices, the assisting torque generated by the second electric motor MG2, and the currently establish speed position of the automatic transmission 22. To establish the engine speed and torque for obtaining the calculated target engine power, the hybrid drive control means 84 controls the engine 24 to operate along the stored highest fuel-economy curve (fuel efficiency map/relation) which is obtained in advance by experimentation so as to maximize both the vehicle drivability and the fuel economy and which is defined in a two-dimensional coordinate system in which the engine speed and torque are taken along the respective axes. In addition, the hybrid drive control means 84 controls the amount of an electric energy to be generated by the first electric motor MG1 (generated electric power).

The hybrid drive control means 84 supplies an electric energy generated by the first electric motor MG1, to the electric-energy storage device 32 and the second electric motor MG2 through the inverters 30, 44. Namely, while a major portion of the drive force produced by the engine 24 is mechanically transmitted to the output shaft 14, the remaining portion of the drive force is consumed by the first electric motor MG1 operated by as the electric generator, and is thus converted into the electric energy, which is supplied to the second electric motor MG2 through the inverters 30, 44, to operate the second electric motor MG2 for driving the output shaft 14. Components associated with the above-indicated generation of the electric energy and consumption of the electric energy by the second electric motor MG2 constitute an electric path by which a portion of the drive force of the engine 24 is converted into an electric energy which is converted into a mechanical energy. It is noted that the hybrid drive control means 84 permits a supply of an electric energy from the electric-energy storage device 32 to the second electric motor MG2 through the second inverter 44 to operate the second electric motor MG2, in addition to the electric energy supplied to the second electric motor MG2 through the above-indicated electric path.

The hybrid drive control means 84 is further configured to control the planetary gear set 26 to perform a differential function for controlling the first electric motor MG1 so as to hold the engine speed substantially constant or to regulate the engine speed to a desired value, irrespective of whether the vehicle is stationary or running. In other words, the hybrid drive control means 84 can control the operating speed of the first electric motor MG1 to a desired value while holding the engine speed substantially constant or regulating the engine speed to the desired value.

Further, the hybrid drive control means 84 is provided with engine output control means functioning to control the engine 24 so as to provide a desired output, by generating the following commands, alone or in combination; a throttle control command for commanding a throttle actuator to open and close an electronic throttle valve; a fuel injection command for controlling an amount and a timing of injection of a fuel by a fuel injecting device; and an ignition timing control command for controlling a timing of the engine ignition by an igniting device such as an igniter.

The hybrid drive control means 84 implements an engine starting control when the hybrid drive control means 84 has made a determination to switch the vehicle drive mode from the motor drive mode using the second electric motor MG2, to the engine drive mode using the engine 24, according to a predetermined drive mode switching map (not shown) for switching the vehicle drive mode. In this engine starting control, the operating speed Ne of the engine 24 is raised by the differential function of the planetary gear set 26 under the control of the first electric motor MG1 and the second electric motor MG2. When the engine speed Ne has been raised to a predetermined value Nig at which the engine ignition is possible, the fuel injection control for the fuel injection by the fuel injecting device, and the ignition timing control for the engine ignition by the igniting device are implemented to start the engine 24. For example, the above-indicated drive mode switching map is defined in a two-dimensional coordinate system in which the vehicle speed VI, and the accelerator pedal opening amount Acc corresponding to the operation amount of the accelerator pedal 27 are taken along respective axes. The drive mode switching map is divided into a motor drive region in which the vehicle is run with the second electric motor MG2, and an engine drive region in which the vehicle is run with the engine 24. For example, the motor drive region lies in an area of a comparatively low vehicle speed and a comparatively small vehicle drive force (small accelerator pedal operation amount), while the engine drive region lies in an area of a medium to high vehicle speed and a medium to large vehicle drive force (medium to large accelerator pedal operation amount).

Accordingly, the motor drive mode using the second electric motor MG2 is established to start the vehicle or to run the vehicle with a relatively low load, and the vehicle drive mode is switched from this motor drive mode to the engine drive mode to accelerate the vehicle. In the latter case, the engine starting control is implemented by the hybrid drive control means 84. If the electric energy amount SOC stored in the electric-energy storage device 32 has been reduced below a lower limit while the present vehicle running state lies within the motor drive region, the hybrid drive control means 84 implements the starting control of the engine 24.

The shift control means 86 is configured to determine the speed position of the automatic transmission 22 to which it should be shifted, on the basis of the vehicle running state as represented by the vehicle speed VL and the accelerator pedal operation amount Acc, and according to the stored shifting map as indicated in FIG. 5, by way of example. The shift control means 86 implements a shifting control to control the first brake B1 and the second brake B2 for establishing the determined speed position of the automatic transmission 22. In FIG. 5, a solid line $L_{UP}$ represents a shift-up boundary line (shift-up line) for a shift-up action from the low-speed position Lo to the high speed position Hi, while a broken line $L_{DN}$ represents a shift-down boundary line (shift-down line) for a shift-down action from the high speed position Hi to the low-speed position Lo. A predetermined amount of hysteresis is provided between the shift-up and shift-down actions. The shifting lines represented by those solid and broken lines $L_{UP}$ and $L_{DN}$ correspond to a shifting rule according to which the automatic transmission 22 is shifted. Described more specifically, the shift control means 86 determines that the shift-up action of the automatic transmission 22 should be performed when a point of the above-indicated vehicle running state has moved across the shift-up line $L_{UP}$ of FIG. 5 from the low vehicle speed area into the high vehicle speed area, and determines that the shift-down action of the automatic transmission 22 should be performed when the point has moved across the shift-down line $L_{DN}$ of FIG. 5 from the high vehicle speed area into the low vehicle speed area. Thus, the shift control means 86 is provided with shifting determining means functioning to determine the shifting action of the automatic transmission 22 according to the shifting map of FIG. 5. It is noted that the shift control means 86 recognizes the vehicle speed VL on the basis of the output signal of the output shaft speed sensor 45, for the above-indicated determination of the shifting action based on the shifting map shown in FIG. 5.

The above-described, shift control means 86 applies a shifting command to a hydraulic control circuit 50 of the automatic transmission 22, to perform the determined shifting action. According to the shifting command, linear solenoid valves of the hydraulic control circuit 50 are controlled to control the operating states of the first and second brakes B1, B2.

If the point of the vehicle running state represented by the vehicle speed VL and the accelerator pedal operation amount Acc has moved across the shift-up line $L_{UP}$ as a result of acceleration of the vehicle during running of the vehicle in the low-speed position Lo (with the second brake B2 placed in the engaged state), for example, the shifting control to release the second brake B2 and engage the first brake B1 is implemented. If the point of the vehicle running state has moved across the shift-down line $L_{DN}$ as a result of deceleration of the vehicle during running of the vehicle in the high-speed position Hi (with the first brake B1 placed in the engaged state), on the other hand, the shifting control to release the first brake B1 and engage the second brake B2 is implemented.

As described below, the shifting permitting/inhibiting means 98 may temporarily inhibit a shifting action of the automatic transmission 22. In the event of inhibition of the shifting action of the automatic transmission 22, the shift control means 86 will not make the determination of the shifting action even where this determination should be made according to the shifting map of FIG. 5. In this case, the determination of the shifting action of the automatic transmission 22 in question is made only after the inhibition of the shifting action is cancelled, that is, immediately after the shifting action is permitted.

As shown in FIG. 4, the above-described hybrid drive control means 84 is provided with a torque reduction control portion in the form of torque reduction control means 90. This torque reduction control means 90 is configured to implement a torque reduction control for temporarily reducing the output torque Tmg2 of the second electric motor MG2 (hereinafter referred to as a "second electric motor torque Tmg2") during a shifting action of the automatic transmission 22, as compared with that prior to the shifting action. This torque reduction control, which is a generally known control to be implemented during a shifting action of a step-variable transmission, is implemented in both of the shift-down and shift-up actions of the automatic transmission 22. The above-indicated torque reduction control implemented during a shifting action of the automatic transmission 22 reduces a shifting shock, or a rise of the operating speed of the second electric motor MG2, for example.

The shifting control detecting means 92 is configured to determine whether the automatic transmission 22 is under a shifting control, that is, whether the shift control means 86 is implementing the shifting control of the automatic transmission 22. The shifting control of the automatic transmission 22 is initiated at a moment of the above-described determination of the shifting action as a result of the movement of the point of the vehicle running state represented by the vehicle speed VL and the accelerator pedal operation amount Acc, across the shifting line $L_{UP}$ or $L_{DN}$ shown in FIG. 5, and is terminated at a moment of completion of all of a series of controls for the shifting action of the automatic transmission 22, which include a hydraulic control within the hydraulic control circuit 50, an engine torque control, and torque controls of the electric motors MG1, MG2, for instance.

The region determining means 94 is configured to determine whether the point of the vehicle running state represented by the vehicle speed VL and the accelerator pedal operation amount Acc lies in one of predetermined electricity-generation-amount-variation restricting regions A01. These restricting regions A01 are obtained in advance by experimentation, to make it possible to restrict an abrupt increase of the amount of the electric energy generated by the first and second electric motors MG1 and MG2 (which abrupt increase may be accompanied with an abrupt decrease of the electric motor output) prior to a moment of initiation of the shifting action of the automatic transmission 22 (a moment of the determination of the shifting action), namely, to make it possible to reduce a rate of change of the generated electric energy amount prior to the moment of initiation of the shifting action of the automatic transmission 22 (moment of the determination of the shifting action). For instance, the electricity-generation-amount-variation restricting regions A01 are defined by parameters in the form of the accelerator pedal operation amount Acc and the vehicle speed VL. Described more specifically, the electricity-generation-amount-variation restricting regions A01 consist of a shift-up electricity-generation-amount-variation restricting region $A01_{UP}$ located adjacent to and on a lower vehicle-speed side of the shift-up boundary line $L_{UP}$, and a shift-down electricity-generation-amount-variation restricting region $A01_{DN}$ located adjacent to and on a higher vehicle-speed side of the shift-down boundary line $L_{DN}$. Accordingly; the above-indicated point of the vehicle running state has moved into one of the electricity-generation-amount variation restricting regions A01, before the shift control means 86 determines the shifting action according to the shifting map of FIG. 5. Where it is not necessary to distinguish the shift-up electricity-generation-amount-variation restricting region $A01_{UP}$ and the shift-down electricity-generation-amount-variation restricting region $A01_{DN}$ from each other, these two restricting regions are collectively referred to as the electricity-generation-amount-variation restricting regions A01.

The electricity-generation-amount-variation restricting means 96 is configured to implement an electricity-generation-amount-variation restricting control for limiting a rate of increase of a total amount of an electric energy generated by the first and second electric motors MG1 and MG2, to a predetermined upper limit value $LT_{GN}$, when the shifting control detecting means 92 has determined that the automatic transmission 22 is under a shifting control, or when the region determining means 94 has determined that the point of the vehicle running state lies in one of the electricity-generation-amount-variation restricting regions A01. For instance, the above-indicated upper limit value $LT_{GN}$ is determined in advance by experimentation by taking account of a delay of the electric power source control circuit 60 to a variation of the outputs of the first and second electric motors MG1, MG2, such that the smoothing capacitor voltage Vcon is held not higher than an upper limit during implementation of the above-described torque reduction control. The rate of increase of the amount of the generated electric energy is an amount of increase of the electric energy generated by the first and second electric motors MG1, MG2 per unit time. The rate of increase is a positive value when the amount of the generated electric energy increases, in other words, when the amount of the consumed electric energy decreases. Although the above-indicated electricity-generation-amount-variation restricting control may be implemented with respect to the total amount of the electric energy generated by the first and second electric motors MG1 and MG2, this restricting control is implemented in this embodiment, for each of the amounts of electric energy generated by the first and second electric motors MG1, MG2, for facilitating the restricting control. The amounts of electric energy generated by the first and second electric motors MG1, MG2 can be calculated on the basis of the electric motor torques Tmg1 and Tmg2 calculated from the electric motor speeds Nmg1 and Nmg2 and the supply currents Img1 and Img2 supplied to the electric motors MG1, MG2. Therefore, it is possible to directly restrict the rate of increase of the total amount of the electric energy generated by the electric motors MG1, MG2. However, since the electric motor speeds Nmg1, Nmg2 can be detected by the electric motor speed sensors 41, 43, the above-indicated electricity-generation-amount-variation restricting control can be easily implemented using the detected electric motor speeds Nmg1, Nmg2. Actually, the amounts of electric energy generated by the electric motors MG1 and MG2 increase with increases of the electric motor speeds Nmg1, Nmg2 during regenerative operations of the electric motors MG1, MG2 during running of the vehicle. In view of this fact, the electricity-generation-amount-variation restricting means 96 in the present embodiment is configured such that an amount of increase ACmg1 of a commanded value of the first electric motor speed Nmg1 per unit time (hereinafter referred to as a "first electric motor speed commanded value increase rate ACmg1") is limited to a predetermined first electric motor acceleration upper limit value $LT_{AC1}$, and such that an amount of increase ACmg2 of a commanded value of the second electric motor speed Nmg2 per unit time (hereinafter referred to as a "second electric motor speed commanded value increase rate ACmg2") is limited to a predetermined second electric motor acceleration upper limit value $LT_{AC2}$. As a result, the rate of increase of the total amount of the electric energy generated by the electric motors MG1 and MG2 is limited to the upper limit value $LT_{GN}$. For preventing the vehicle operator from feeling uneasy about the restricting control, it is preferable to restrict the first electric motor speed commanded value increase rate ACmg1 and the second electric motor speed commanded value increase rate ACmg2 such that these increase rates ACmg1 and ACmg2 smoothly vary, for example, rather than to restrict the increase rates ACmg1 and ACmg2 to the respective first and second electric motor acceleration upper limit values $LT_{AC1}$ and $LT_{AC2}$ at the moment of initiation of the above-indicated electricity-generation-amount-variation restricting control. The above-indicated first and second electric motor acceleration upper limit values $LT_{AC1}$ and $LT_{AC2}$ are determined in advance by experimentation based on the actual running state of the vehicle, so that the rate of increase of the total amount of the electric energy generated by the first and second electric motors MG1 and MG2 is limited to the upper limit $LT_{GN}$. Where it is better not to restrict the rate of increase of the amount of the electric energy generated by the first electric motor MG1 or second electric motor MG2, during a control initiated before the point of the vehicle running state falls within the electricity-generation-amount-variation restricting region A01, this control may be excluded from the electricity-generation-amount-variation restricting control.

The shifting permitting/inhibiting means 98 is configured to inhibit a shifting action of the automatic transmission 22 during a time period from a moment when the point of the vehicle running state has moved into one of the electricity-generation-amount-variation restricting regions A01, to a moment when an output variation of the first electric motor MG1 and an output variation of the second electric motor MG2 have been reduced to within a predetermined permissible range. In the present embodiment, the electricity-generation-amount-variation restricting means 96 implements the above-described electricity-generation-amount-variation restricting control when the point of the above-indicated vehicle running state has moved into one of the electricity-generation-amount-variation restricting regions A01, so that the moment when the point of the vehicle running state has moved into the electricity-generation-amount-variation restricting regions A01 may be interpreted to be the moment when the electricity-generation-amount-variation restricting means 96 has initiated the above-indicated electricity-generation-amount-variation restricting control. The above-indicated predetermined permissible range is determined in advance by experimentation so as to assure that the smoothing capacitor voltage Vcon is held not higher than an upper limit even during implementation of the above-described torque reduction control as long as the output variations of the electric motors MG1, MG2 have been reduced to within the permissible range.

For facilitating the control, the shifting permitting/inhibiting means 98 in the present embodiment is not configured to directly determine whether the output variation of the first electric motor MG1 and the output variation of the second electric motor MG2 have been reduced to within the predetermined permissible range, but is configured to measure an elapse time period from the moment when the point of the vehicle running state has moved into one of the electricity-generation-amount-variation restricting regions A01, for thereby determining whether the inhibition of the shifting action of the automatic transmission 22 should be cancelled or not. Namely, the shifting permitting/inhibiting means 98 inhibits the shifting action of the automatic transmission 22 for a time period from the moment when the point of the vehicle running state has moved into one of the electricity-generation-amount-variation restricting regions A01, up to a moment when a predetermined shifting-action inhibiting time period TIME1 has elapsed after the moment when the point has moved into the electricity-generation-amount-variation restricting region A01. When the shifting-action inhibiting time period TIME1 has elapsed, the shifting permitting/inhibiting means 98 cancels the inhibition of the shifting action of the automatic transmission 22, and permits the shifting action of the automatic transmission 22.

Although the shifting permitting/inhibiting means 98 in the present embodiment determines whether the inhibiting of the shifting action of the automatic transmission 22 should be cancelled or not, by determining whether the shifting-action inhibiting time period TIME1 has elapsed after the moment when the point of the vehicle running state has moved into one of the electricity-generation-amount-variation restricting regions A01, as described above, the determination as whether the inhibition of the shifting action of the automatic transmission 22 should be cancelled or not may be made on the basis of a physical value other than the elapse time period. In a first example of this modification, the shifting permitting/inhibiting means 98 determines from time to time whether an amount of variation of an electric energy (e.g., kW) generated by each of the electric motors MG1, MG2 within a predetermined determination time period $TIME_X$ has been reduced below a predetermined electricity-generation-amount convergence threshold value $LX_{WMG}$, and may inhibit the shifting action of the automatic transmission 22 until the amount of variation of the electric energy generated by each of the electric motors MG1, MG2 within the predetermined determination time period $TIME_X$ has been reduced to or below the electricity-generation-amount convergence threshold value $LX_{WMG}$. The amount of variation of the generated electric energy to be compared with the above-indicated electricity-generation-amount convergence threshold value $LX_{WMG}$ is an absolute value of a difference between a maximum value and minimum value of the electric power (output) generated by the electric motor MG1, MG2 within the determination time period $TIME_X$.

It is considered that the amount of the output variation of each of the electric motors MG1, MG2 is reduced if the amount of variation of the operating speed of each of the electric motors MG1, MG2 is reduced. In a second example of the modification, therefore, the shifting permitting/inhibiting means 98 determines from time to time whether an amount of variation of the operating speed (e.g., rpm) of each of the electric motors MG1, MG2 within the predetermined determination time period $TIME_X$ has been reduced below a predetermined speed convergence threshold value $LX_{NMG}$, and may inhibit the shifting action of the automatic transmission 22 until the amount of variation of the operating speed of each of the electric motors MG1, MG2 within the predetermined determination time period $TIME_X$ has been reduced below the speed convergence threshold value $LX_{NMG}$. The amount of variation of the operating speed to be compared with the above-indicated speed convergence threshold value $LX_{NMG}$ is an absolute value of a difference between a maximum value and minimum value of the operating speed Nmg1, Nmg2 of the electric motor MG1, MG2 within the determination time period $TIME_X$.

It is also considered that the amount of the output variation of each of the electric motors MG1, MG2 is reduced if the amount of variation of the output torque of each of the electric motors MG1, MG2 is reduced. In a third example of the modification, therefore, the shifting permitting/inhibiting means 98 determines from time to time whether an amount of variation of the output torque (e.g., Nm) of each of the electric motors MG1, MG2 within the predetermined determination time period $TIME_X$ has been reduced below a predetermined torque convergence threshold value $LX_{TMG}$, and may inhibit the shifting action of the automatic transmission 22 until the amount of variation of the output torque of each of the electric motors MG1, MG2 within the predetermined determination time period $TIME_X$ has been reduced below the torque convergence threshold value $LX_{TMG}$. The amount of variation of the output torque to be compared with the above-indicated, torque convergence threshold value $LX_{TMG}$ is an absolute value of a difference between a maximum value and minimum value of the output torque Tmg1, Tmg2 of the electric motor MG1, MG2 within the determination time period $TIME_X$.

The shifting-action inhibiting time TIME1, the determination time period $TIME_X$, the electricity-generation-amount convergence threshold value $LX_{WMG}$, the speed convergence threshold value $LX_{NMG}$ and the torque convergence threshold value $LX_{TMG}$ are provided for the same purpose as the above-indicated permissible range of the output variation, and are therefore determined in advance by experimentation so as to assure that the smoothing capacitor voltage Vcon is held not higher than the upper limit even during implementation of the above-described torque reduction control as long as the output variations of the electric motors MG1, MG2 are held within the permissible range in the same manner as the permissible range of the output variation. Further, each of the determination time period. $TIME_X$, the electricity-generation-amount convergence threshold value $LX_{WMG}$, the speed convergence threshold value $LX_{NMG}$ and the torque convergence threshold value $LX_{TMG}$ may be commonly used with respect to both of the first and second electric motors MG1 and MG2, or may be different values used for the respective electric motors MG1, MG2.

Further, the shifting permitting/inhibiting means 98 may be configured to inhibit the shifting action of the automatic transmission 22, on the basis of a combination of: a result of the above-described determination based on the time period elapsing after the moment when the point of the vehicle running state has moved into one of the electricity-generation-amount-variation restricting regions A01; a result of the above-described determination based on the amount of variation of the electric energy generated by the electric motors MG1, MG2; a result of the above-described determination based on the amount of variation of the operating speeds of the electric motors MG1, MG2; and a result of the above-described determination based on the amount of variation of the output torques of the electric motors MG1, MG2. Namely, the shifting permitting/inhibiting means 98 may inhibit the shifting action of the automatic transmission 22 until the shifting-action inhibiting time period TIME1 has elapsed after the moment when the point of the above-described vehicle running state has moved into the electricity-generation-amount-variation restricting region A01, until the amount of variation of the electric energy generated by each of the electric motors MG1, MG2 within the above-indicated determination time period $TIME_X$ has been reduced below the above-indicated electricity-generation-amount convergence threshold value $LX_{WMG}$, until the amount of variation of the operating speed of each of the electric motors MG1, MG2 within the above-indicated determination time period $TIME_X$ has been reduced below the above-indicated speed convergence threshold value $LX_{NMG}$, and until the amount of variation of the output torque of each of the electric motors MG1, MG2 within the above-indicated determination time period $TIME_X$ has been reduced below the torque convergence threshold value $LX_{TMG}$.

Figure 6:
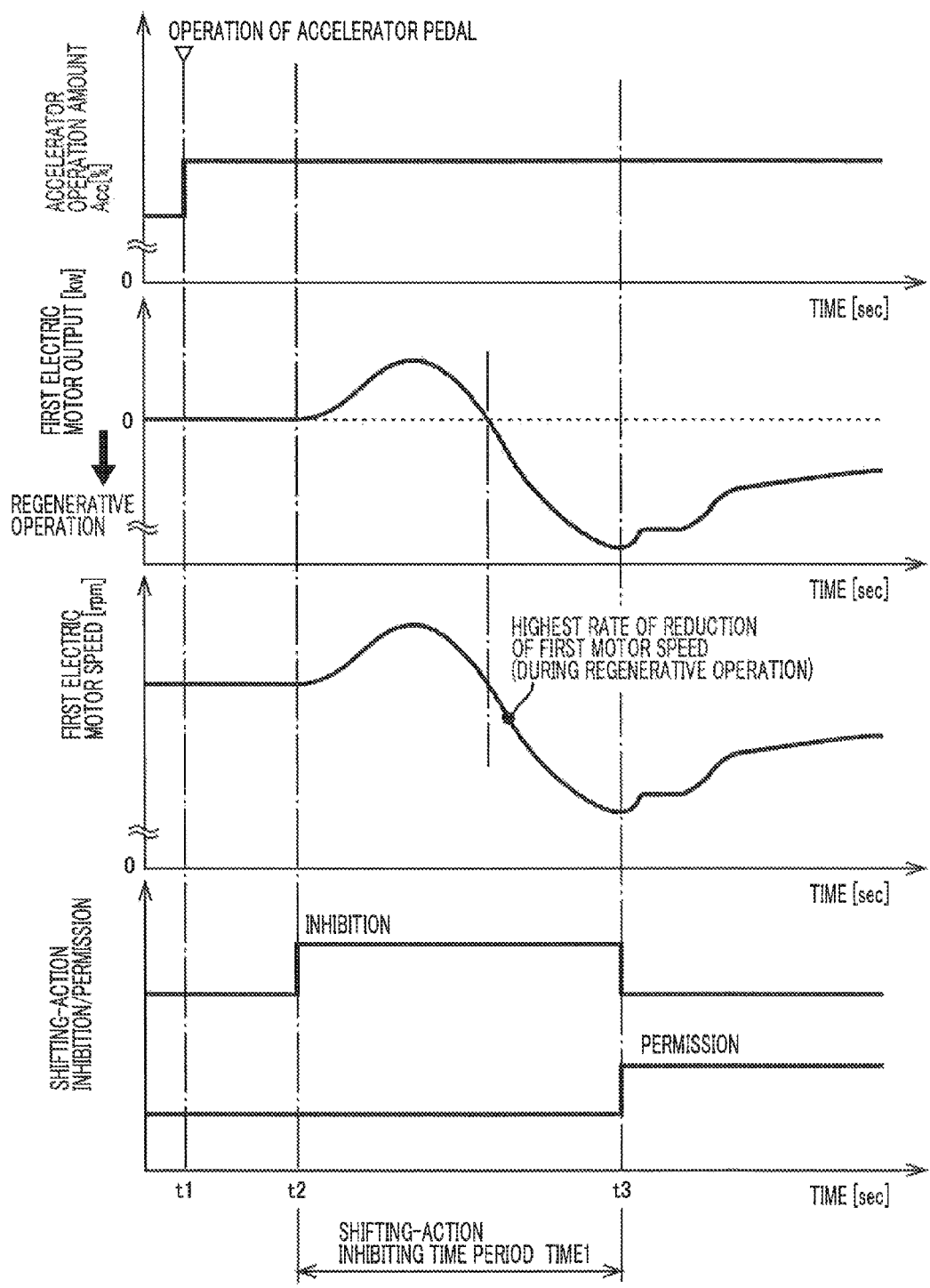
FIG. 6 is a time chart for explaining inhibition of a shifting action of the automatic transmission and subsequent cancellation of the inhibition and permission of the shifting action, when an engine is started as a result of an operation of the accelerator pedal in the vehicular drive system of FIG. 1.

FIG. 6 is the time chart for explaining the inhibition of a shifting action of the automatic transmission 22 and subsequent cancellation of the inhibition and permission of the shifting action, when the engine 24 is started as a result of an operation of the accelerator pedal 27 (accel-on). In this specific example of FIG. 6, the shift-up action of the automatic transmission 22 is initially inhibited and then permitted.

As indicated in FIG. 6, the accelerator pedal 27 is operated by the vehicle operator at a point of time t1, and the shifting permitting/inhibiting means 98 inhibits the shifting action of the automatic transmission 22 at a point of time t2, and cancels the inhibition and permits the shifting action of the automatic transmission 22 at a point of time t3. Thus, a time period between the points of time t2 and t3 is the above-indicated shifting-action inhibiting time period TIME1.

As a result of the operation of the accelerator pedal 27 at the point of time t1, the first electric motor MG1 is operated for cranking the engine to start the engine, during the time period between the points of time t2 and t3, and the first electric motor speed Nmg1 is raised. When the engine 24 is subsequently ignited, the first electric motor MG1 generates a reaction torque to permit the engine torque to be transmitted to the output shaft 14, so that the absolute value of the regenerative (electric energy generating) output of the first electric motor MG1 is increased, while at the same time the first electric motor speed Nmg1 is reduced with an increase of the speed of the engine 24 operated by itself. At and after the point of time t3, the rates of variation of the output of the first electric motor MG1 and the first electric motor speed Nmg1 have been substantially reduced below the convergence threshold values. That is, in the example of FIG. 6, the shifting permitting/inhibiting means 98 initiates the inhibition of the shifting action of the automatic transmission 22 at the moment (point of time t2) when the point of the vehicle running state has moved into one of the electricity-generation-amount-variation restricting regions A01 as a result of the operation of the accelerator pedal 27, and the output variation of the first electric motor MG1 caused by the operation of the accelerator pedal 27 has been substantially reduced below the convergence threshold value by the time when the shifting permitting/inhibiting means 98 cancels the above-indicated inhibition of the shifting action, namely, by the time when the shifting-action inhibiting time TIME1 has elapsed.

As indicated in FIG. 6, the shifting permitting/inhibiting means 98 cancels the inhibition of the shifting action of the automatic transmission 22 and permits the shifting action at the point of time t3 subsequent to a point of time at which the rate of reduction of the first electric motor speed Nmg1 during the regenerative operation of the first electric motor MG1 becomes highest after the point of the vehicle running state has moved into one of the electricity-generation-amount-variation, restricting regions A01 as a result of the operation of the accelerator pedal 27 by the vehicle operator. Therefore, the shifting permitting/inhibiting means 98 may implement the cancellation of the inhibition and the permission of the shifting action of the automatic transmission 22 at a point of time after the point of time at which the rate of reduction of the first electric motor speed Nmg1 during the regenerative operation of the first electric motor MG1 becomes highest after the point of the vehicle running state has moved into one of the electricity-generation-amount-variation restricting regions A01 as a result of the operation of the accelerator pedal 27 by the vehicle operator, rather than at the point of time at which the shifting-action inhibiting time period TIME1 has elapsed. The above-indicated rate of reduction of the first electric motor speed Nmg1 is an amount of reduction of the first electric motor speed Nmg1 per unit time, and is a positive value when the first electric motor speed Nmg1 is reduced. The point of time at which the rate of reduction of the first electric motor speed Nmg1 has become highest can be detected by various methods. For example, the shifting permitting/inhibiting means 98 calculates the rate of reduction of the first electric motor speed Nmg1 from time to time after the moment of inhibition of the shifting action of the automatic transmission 22, and determines that the rate of reduction of the first electric motor speed Nmg1 has become highest at a point of time at which the rate of reduction of the first electric motor speed Nmg1 which has been increasing begins to decrease during the regenerative operation of the first electric motor MG1.

While the engine 24 is started as a result of an operation of the accelerator pedal in the example of FIG. 6, the operation of the engine 24 initiated even before the point of time t1 in FIG. 6 also causes an early rise of the engine speed Ne, and a similar variation of the first electric motor speed Nmg1 as indicated in FIG. 6.

FIG. 7 is the flow chart for explaining a major control operation of the electronic control device 28, namely, the above-described electricity-generation-amount-variation restricting control operation to temporarily inhibit a shifting action of the automatic transmission 22. This control operation is repeatedly executed with an extremely short cycle time of about several milliseconds to about several tens of milliseconds. The control operation illustrated in the flow chart of FIG. 7 is executed during braking of the vehicle 8 as a result of an operation of the brake pedal 29, as well as during running of the vehicle 8 with the accelerator pedal 27 (power-on running) being operated.

The control operation is initiated with step SA1 (hereinafter "step" being omitted) corresponding to the shifting control detecting means 92, to determine whether the automatic transmission 22 is under a shifting control. If an affirmative determination is obtained in SA1, that is, the automatic transmission 22 is under the shifting control, the control flow goes to SA2. If a negative determination is obtained in SA1, the control flow goes to SA3.

SA2 corresponding to the electricity-generation-amount-variation restricting means 96 is implemented to implement the above-described electricity-generation-amount-variation restricting control for inhibiting an abrupt variation of the amount of an electric energy generated (electricity generation) by the electric motors MG1, MG2, more specifically, an abrupt increase of the amount of the generated electric energy.

SA3 corresponding to the region determining means 94 is implemented to determine whether the point of the vehicle running state represented by the vehicle speed VL and the accelerator pedal operation amount Acc has moved into one of the above-described electricity-generation-amount-variation restricting regions A01. If an affirmative determination is obtained in SA3, that is, if the point of the above-indicated vehicle running state has moved into one of the restricting regions A01, the control flow goes to SA4. If a negative determination is obtained in SA3, the control operation of the flow chart is terminated.

SA4 corresponding to the electricity-generation-amount-variation restricting means 96 is implemented to implement the above-described electricity-generation-amount-variation restricting control, as in the above-described SA2. SA4 is followed by SA5.

SA5 is implemented to measure an elapse time period $TIME_{PS}$ after the moment when the point of the vehicle running state has moved into one of the electricity-generation-amount-variation restricting regions A01, for instance, the elapse time period $TIME_{PS}$ after the moment when the negative determination in SA3 has been changed to the affirmative determination. That is, the above-indicated elapse time period $TIME_{PS}$ (time period during which the abrupt variation of the electricity generation by the electric motors is inhibited) is initiated to zero, in SA5, at the moment when the point of the vehicle running state has moved into one of the electricity-generation-amount-variation restricting regions A01, and the elapse time period $TIME_{PS}$ is counted up. SA5 is followed by SA6.

SA6 is implemented to determine whether the above-indicated elapse time period $TIME_{PS}$ counted up in SA5 is shorter than the above-described shifting-action inhibiting time period TIME1. If an affirmative determination is obtained in SA6, that is, if the above-indicated elapse time period $TIME_{PS}$ counted up in SA5 is shorter than the above-described shifting-action inhibiting time period TIME1, the control flow goes to SA7. If a negative determination is obtained in SA6, that is, if the shifting-action inhibiting time period TIME1 has elapsed after the moment when the point of the vehicle running state has moved into one of the electricity-generation-amount-variation restricting regions A01, the control flow goes to SA8.

SA7 is implemented to inhibit a shifting action of the automatic transmission 22. Namely, the determination that the automatic transmission 22 should be shifted is inhibited.

SA8 is implemented to cancel the inhibition of the shifting action of the automatic transmission 22, and to permit the shifting action of the automatic transmission 22. Namely, the determination to perform the shifting action of the automatic transmission 22 is permitted. It is noted that SA5-SA8 correspond to the shifting permitting/inhibiting means 98.

FIGS. 8-11 are the flow charts corresponding to the FIG. 7 and illustrating other embodiments of the invention, wherein steps SA5 and SA6 of FIG. 7 are replaced by another step. These flow charts shows the step replacing SA5 and SA6 of FIG. 7.

FIG. 8 shows the embodiment in which SA5 and SA6 of FIG. 7 are replaced by SB1. In the embodiment of FIG. 8, SA4 of FIG. 7 is followed by SB1 corresponding to the shifting permitting/inhibiting means 98. SB1 is implemented to determine whether the amount of variation of the electric energy generated by each of the electric motors MG1, MG2 within the predetermined determination time period $TIME_X$ has been reduced below the predetermined electricity-generation-amount convergence threshold value $LX_{WMG}$. If an affirmative determination is obtained in SB1, that is, if the amount of variation of the electric energy generated by each of the electric motors MG1, MG2 within the predetermined determination time period $TIME_X$ has been reduced below the predetermined electricity-generation-amount convergence threshold value $LX_{WMG}$, the control flow goes to SA8. If a negative determination is obtained in SB1, the control flow goes to SA7.

FIG. 9 shows the embodiment in which SA5 and SA6 of FIG. 7 are replaced by SC1. In the embodiment of FIG. 9, SA4 of FIG. 7 is followed by SC1 corresponding to the shifting permitting/inhibiting means 98. SC1 is implemented to determine whether the amount of variation of the operating speed of each of the electric motors MG1, MG2 within the predetermined determination time period $TIME_X$ has been reduced below the predetermined speed convergence threshold value $LX_{NMG}$. If an affirmative determination is obtained in SC1, that is, if the amount of variation of the operating speed of each of the electric motors MG1, MG2 within the predetermined determination time period $TIME_X$ has been reduced below the predetermined speed convergence threshold value $LX_{NMG}$, the control flow goes to SA8. If a negative determination is obtained in SC1, the control flow goes to SA7.

FIG. 10 shows the embodiment in which SA5 and SA6 of FIG. 7 are replaced by SD1. In the embodiment of FIG. 10, SA4 of FIG. 7 is followed by SD1 corresponding to the shifting permitting/inhibiting means 98. SD1 is implemented to determine whether the amount of variation of the output torque of each of the electric motors MG1, MG2 within the predetermined determination time period $TIME_X$ has been reduced below the predetermined torque convergence threshold value $LX_{TMG}$. If an affirmative determination is obtained in SD1, that is, if the amount of variation of the output torque of each of the electric motors MG1, MG2 within the predetermined determination time period $TIME_X$ has been reduced below the predetermined torque convergence threshold value $LX_{TMG}$, the control flow goes to SA8. If a negative determination is obtained in SD1, the control flow goes to SA7.

FIG. 11 shows the embodiment in which SA5 and SA6 of FIG. 7 are replaced by SE1 and SE2. In the embodiment of FIG. 11, SA4 of FIG. 7 is followed by SE1. SE1 is implemented to determine whether the accelerator pedal 27 is placed in an operated state. This determination may be made from time to time, or when the point of the vehicle running state has moved into one of the electricity-generation-amount-variation restricting regions A01. If an affirmative determination is obtained in SE1, that is, if the accelerator pedal 27 is placed in an operated state, the control flow goes to SE2. If a negative determination is obtained in SE1, the control flow goes to SA8.

SE2 of FIG. 11 is implemented to determine whether the rate of reduction of the first electric motor speed Nmg1 during the regenerative operation of the first electric motor MG1 has become highest after the moment when the point of the vehicle running state has moved into one of the electricity-generation-amount-variation restricting regions A01. If an affirmative determination is obtained in SE2, that is, if the rate of reduction of the first electric motor speed Nmg1 during the regenerative operation of the first electric motor MG1 has become highest after the moment when the point of the vehicle running state has moved into one of the electricity-generation-amount-variation restricting regions A01, the control flow goes to SA8. If a negative determination is obtained in SE2, the control flow goes to SA7. It is noted that SE1 and SE2 correspond to the shifting permitting/inhibiting means 98.

The illustrated embodiments are configured such that the electricity-generation-amount-variation restricting regions A01 are predetermined as shown in FIG. 5 such that the point of the vehicle running state lies in one of the electricity-generation-amount-variation restricting regions A01 prior to a moment of determination to perform a shifting action of the automatic transmission 22 according to the shifting map, and such that the electricity-generation-amount-variation restricting means 96 implements the electricity-generation-amount-variation restricting control to restrict the rate of increase of the total amount of the electric energy generated by the first electric motor MG1 and the second electric motor MG2, to the predetermined upper limit value $LT_{GN}$, when the region determining means 94 has determined that the point of the vehicle running state lies in one of the electricity-generation-amount-variation restricting regions A01. Accordingly it is possible to prevent an abrupt increase of the total amount of the electric energy generated by the first and second electric motors MG1 and MG2 prior to the above-described torque reduction control to be implemented during the shifting action of the automatic transmission 22. As a result, the amount of a surplus electric energy during the above-described torque reduction control can be reduced as compared with that where the above-described electricity-generation-amount-variation restricting control is not implemented, so that the required electrostatic capacity of the inverter smoothing capacitor 66 can be reduced. Namely, the size and cost of the inverter smoothing capacitor 66 tend to be reduced as the above-indicated required electrostatic capacity is reduced, so that the size and cost of the electric power source control circuit 60 including the inverter smoothing capacitor 66 can be reduced.

The illustrated embodiments are further configured such that the shifting permitting/inhibiting means 98 inhibits a shifting action of the automatic transmission 22 during a time period from a moment when the point of the above-described vehicle running state has moved into one of the electricity-generation-amount-variation restricting regions A01, up to one of: a moment when the predetermined shifting-action inhibiting time period TIME1 has elapsed after the moment when the above-indicated point has moved into the electricity-generation-amount-variation restricting region A01, a moment when the amount of variation of the electric energy generated by each of the electric motors MG1, MG2 within the above-indicated determination time period $TIME_X$ has been reduced below the above-indicated electricity-generation-amount convergence threshold value $LX_{WMG}$; a moment when the amount of variation of the operating speed of each of the electric motors MG1, MG2 within the above-indicated determination time period $TIME_X$ has been reduced below the above-indicated speed convergence threshold value $LX_{NMG}$; and a moment when the amount of variation of the output torque of each of the electric motors MG1, MG2 within the above-indicated determination time period $TIME_X$ has been reduced below the predetermined torque convergence threshold value $LX_{TMG}$. Accordingly, the shifting action of the automatic transmission 22 will not be performed until the output variation of each electric motor MG1, MG2 has been reduced to a given threshold value, so that it is possible to more stably reduce the surplus electric energy generated during the above-indicated torque reduction control. The vehicle speed VL is detected on the basis of the rotating speed of the drive wheels 18 detected by the output shaft speed sensor 45, for example, so that the vehicle speed. VL used to determine whether a shifting action of the automatic transmission 22 should be performed or not is recognized to be abruptly raised when the drive wheels 18 have slipping motions, and to be abruptly zeroed when the drive wheels 18 are locked. In these cases, the determination that the shifting action should be performed may be made substantially at the same time when the point of the vehicle running state has moved into one of the electricity-generation-amount-variation restricting regions A01. Even in these cases, an abrupt increase of the total amount of the electric energy generated by the electric motors MG1, MG2 can be stably prevented prior to the moment of initiation of the shifting action of the automatic transmission 22, and the surplus electric energy generated during the above-indicated torque reduction control can be reduced. In addition, even where the amount of the electric energy generated by the first electric motor MG1 is increased due to an operation of the accelerator pedal at a delayed timing with respect to the moment of operation of the accelerator pedal, as indicated in the time chart of FIG. 6, it is possible to initiate the shifting action of the automatic transmission 22 only after the increase of the amount of the generated electric energy has been reduced to a given threshold value.

The illustrated embodiments are also configured such that the electricity-generation-amount-variation restricting means 96 implements the above-described electricity-generation-amount-variation restricting control also during the shifting action of the automatic transmission is detected by the shifting control detecting means 92, so that an abrupt increase of the total amount of electric energy generated by the electric motors MG1, MG2 can be prevented also during the shifting action of the automatic transmission 22.

The illustrated embodiments are further configured such that the drive system 10 is provided with the engine 24, and the differential mechanism in the form of the planetary gear set 26 which constitutes a part of the power transmitting path between the engine 24 and the drive wheels 18, and the differential state of which is controlled by controlling the first electric motor MG1. Accordingly, in the hybrid vehicle 8 provided with two electric motors consisting of the first electric motor MG1 and the second electric motor MG2, as shown in FIG. 1, the electrostatic capacity of the inverter smoothing capacitor 66 can be reduced, and the size and cost of the electric power source control circuit 60 including the inverter smoothing capacitor 66 can be reduced, in the hybrid vehicle 8.

The illustrated embodiments may be configured such that the shifting permitting/inhibiting means 98 inhibits the shifting action of the automatic transmission 22 when the point of the vehicle running state has moved into one of the electricity-generation-amount-variation restricting regions A01 as a result of an operation of the accelerator pedal 27, and cancels the inhibition of the shifting action of the automatic transmission 22 and permits the shifting action of the automatic transmission 22 at a point of time after the moment when the rate of reduction of the first electric motor speed Nmg1 during the regenerative operation of the first electric motor MG1 has become highest after the point of the vehicle running state has moved into the electricity-generation-amount-variation restricting region A01. Accordingly, the shifting action of the automatic transmission 22 is permitted by the shifting permitting/inhibiting means 98 only after the output variation of the first electric motor MG1 has been reduced to a given threshold value, so that it is possible to more stably reduce the surplus electric energy generated during the above-indicated torque reduction control. Further, since the first electric motor speed Nmg1 can be easily detected by the first electric motor speed sensor 41, the point of time at which the shifting action of the automatic transmission 22 is permitted can be easily determined according to the operating state of the first electric motor MG1. In addition, since the shifting permitting/inhibiting means 98 permits the shifting action of the automatic transmission 22 on the basis of the operating state of the first electric motor MG1, it is possible to permit the shifting action of the automatic transmission 22 at a suitable point of time according to the operating state of the first electric motor MG1.

The illustrated embodiments are also configured such that the above-described shifting map defines the shift-up boundary line $L_{UP}$ for determination of shifting up the automatic transmission 22 when the point of the vehicle running state represented by the vehicle speed VL and the accelerator pedal operation amount Acc has moved across the shift-up boundary line $L_{UP}$ from a low vehicle speed area into a high vehicle speed area, and the shift-down boundary line $L_{DN}$ for shifting down the automatic transmission 22 when the above-indicated point of the vehicle running state has moved across the shift-down boundary line $L_{DN}$ from the high vehicle speed area into the low vehicle speed area as shown in FIG. 5. The above-indicated electricity-generation-amount-variation restricting regions A01 consist of the shift-up electricity-generation-amount-variation restricting region $A01_{UP}$ located adjacent to and on the lower vehicle-speed side of the shift-up boundary line $L_{UP}$, and the shift-down electricity-generation-amount-variation restricting region $A01_{DN}$ located adjacent to and on the higher vehicle-speed side of the shift-down boundary line $L_{DN}$. Thus, the electricity-generation-amount-variation restricting regions A01 can be set with respect to the shifting map (defining the shift-up boundary line $L_{UP}$ and the shift-down boundary line $L_{DN}$) commonly used for controlling the shifting operation of the automatic transmission 22.

While the embodiments of this invention have been described in detail by reference to the drawings, for illustrative purpose only it is to be understood that the present invention may be embodied with various changes and improvements, which may occur to those skilled in the art.

While the automatic transmission 22 provided in the illustrated embodiments has the two speed positions, the automatic transmission 22 is not limited to an automatic transmission having the two speed positions, and may have three or more speed positions.

In the embodiment of FIG. 5, the electricity-generation-amount-variation restricting regions A01 consist of the shift-up electricity-generation-amount-variation restricting region $A01_{UP}$ and the shift-down electricity-generation-amount-variation restricting region $A01_{DN}$, only one of the restricting regions $A01_{UP}$ and $A01_{DN}$ may be provided.

In the illustrated embodiments, the low vehicle-speed, side boundary line of the shift-up electricity-generation-amount-variation restricting region $A01_{UP}$ of FIG. 5 is determined in advance by experimentation so as to restrict an abrupt increase of the electric energy generated by the first and second electric motors MG1 and MG2 before initiation of a shift-up action of the automatic transmission 22. However, this low vehicle-speed side boundary line may be changed from time to time on the basis of at least one of: the electric motor speeds Nmg1, Nmg2 the output torques of the first and second electric motors Tmg1, Tmg2; and the engine speed Ne. The above description with respect to the low vehicle-speed side boundary line of the shift-up electricity-generation-amount-variation restricting region $A01_{UP}$ of FIG. 5 applies to the high vehicle-speed side boundary line of the shift-down electricity-generation-amount-variation restricting region $A01_{DN}$.

In the illustrated embodiments, the above-described shifting-action inhibiting time period TIME1 is obtained in advance by experimentation so as to assure that the smoothing capacitor voltage Vcon is held not higher than the upper limit even during implementation of the above-described torque reduction control as long as the output variations of the electric motors MG1, MG2 have been sufficiently reduced within the shifting-action inhibiting time period. TIME1. This shifting-action inhibiting time period TIME1 may be kept constant, or changed from time to time on the basis of at least one of: the amounts of variation of the electric motor speeds Nmg1, Nmg2 per unit time; the electric motor speeds Nmg1, Nmg2; the output torques of the first and second electric motors Tmg1, Tmg2; and the amounts of electric energy generated by the electric motors MG1, MG2.

Alternatively, the above-described shifting-action inhibiting time period. TIME1 used in the illustrated embodiments may be changed from time to time on the basis of the engine speed. Ne, and according to a relationship (map) between the inhibiting time period. TIME1 and the engine speed Ne, which is obtained in advance by experimentation, or on the basis of the amounts of electric energy generated by the electric motors MG1, MG2, and according to a relationship (map) between the inhibiting time period TIME1 and the generated electric energy amounts, which is obtained in advance by experimentation.

Figure 12:
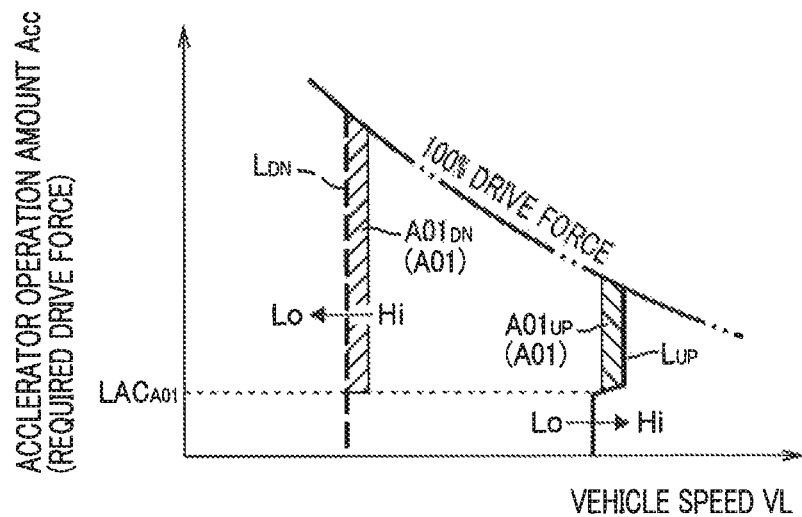
FIG. 12 is a view corresponding to that of FIG. 5, showing an embodiment of the invention wherein the above-indicated electricity-generation-amount-variation restricting regions are not provided in an area in which the operation amount of the accelerator pedal is smaller than a lower limit.

Although, in the above-described embodiment, the shift-up electricity-generation-amount-variation restricting region $A01_{UP}$ and the shift-down electricity-generation-amount-variation restricting region $A01_{DN}$ that are indicated in FIG. 5 cover the entire range of the accelerator pedal operation amount Acc, at least one of these shift-up and shift-down electricity-generation-amount-variation restricting regions $A01_{UP}$ and $A01_{DN}$ may not cover a small-Acc area in which the accelerator pedal operation amount Acc is relatively small. FIG. 12 shows an example in which the electricity-generation-amount-variation restricting regions A01 are provided in the small-Acc area in which the accelerator operation amount Acc is not smaller than a lower limit value $LAC_{A01}$ obtained in advance by experimentation, but are not provided in an area in which the accelerator pedal operation amount Acc is smaller than the lower limit value $LAC_{A01}$. In this example, it is possible to minimize a possibility of an abrupt increase of the amounts of electric energy generated by the electric motors MG1, MG2, together with a small output of the drive wheels in the small-Acc area, and therefore possible to reduce the frequency of unnecessary restriction of increase of the amounts of electric energy generated by the electric motors MG1, MG2, as compared with that where the electricity-generation-amount-variation restricting regions A01 are provided so as to cover the entire range of the accelerator pedal operation amount Acc.

Further, the above-indicated lower limit value $LAC_{A01}$ of the accelerator pedal operation amount may be a constant value, or may be changed from time to time on the basis of at least one of: the electric motor speeds Nmg1, Nmg2; the electric motor torques Tmg1, Tmg2; and the engine speed Ne.

In the embodiment of FIG. 11, SE2 is implemented to determine whether the rate of reduction of the first electric motor speed Nmg1 during the regenerative operation of the first electric motor MG1 has become highest after the moment when the point of the vehicle running state has moved into one of the electricity-generation-amount-variation restricting regions A01. However, the determination in SE2 may be modified. Namely, the control operation of FIG. 11 may be modified such that when the engine 24 is started as a result of an operation of the accelerator pedal, for instance, SE2 is implemented to determine whether the first electric motor MG1 which has been operating to provide a vehicle driving force begins to perform a regenerative operation. If the first electric motor MG1 begins to perform the regenerative operation, the control flow goes to SA8. Alternatively, the control operation may be modified such that SE2 is implemented to determine whether the engine 24 has been operated by itself with the ignition, and the control flow goes to SA8 when the engine 24 has been operated by itself.

Although the electronic control device 28 in the illustrated embodiments is provided with the shifting permitting/inhibiting means 98, as shown in FIG. 4, the electronic control device 28 need not be functionally provided with the shifting permitting/inhibiting means 98.

Figure 13:
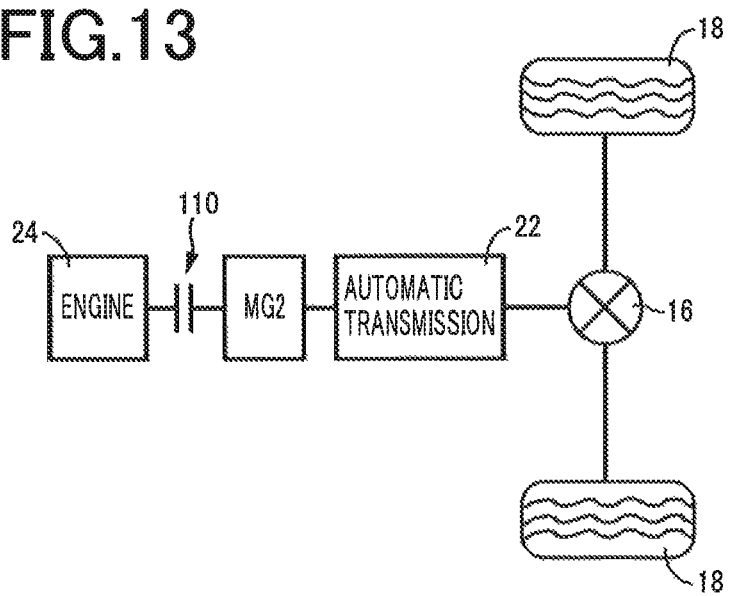
FIG. 13 is a schematic view for explaining an arrangement of a parallel hybrid vehicle which is different from that of the hybrid vehicle shown in FIG. 1, and to which the present invention is also applicable.

While the drive system 10 in the preceding embodiments is provided with the planetary gear set 26 and the first electric motor MG1, the present invention is also applicable to a so-called parallel hybrid vehicle which is not provided with the first electric motor MG1 and the planetary gear set 26 and in which the engine 24, a clutch 110, the second electric motor MG2, the automatic transmission 22 and the drive wheels 18 are connected in series with each other, as shown in FIG. 13. It is noted that the clutch 110 between the engine 24 and the second electric motor MG2 is provided as needed, and that the above-described parallel hybrid vehicle may not be provided with the clutch 110. Further, the drive system 10 may be replaced by a drive system for an electric vehicle, which is not provided with the engine 24 and clutch 110 shown in FIG. 13.

Further, the shifting permitting/inhibiting means 98 in the illustrated embodiments is configured to temporarily inhibit a shifting action of the automatic transmission 22 when the point of the vehicle running state has moved into one of the electricity-generation-amount-variation restricting regions A01. This temporary inhibition of the shifting action has a significant advantage as described above with respect to the illustrated embodiments, even where the temporary inhibition is implemented in the above-described parallel hybrid vehicle or electric vehicle. For example, the temporary inhibition of the shifting action of the automatic transmission 22 stably prevents an abrupt increase of the amount of electric energy generated by the second electric motor MG2 prior to the shifting action, in the event of slipping or locking of the drive wheels 18, as in the illustrated embodiments. In addition, the above-indicated temporary inhibition of the shift-down action of the automatic transmission 22 causes the shift-down action to eventually take place at a relatively low vehicle running speed, where the shift-down action is performed during a regenerative operation of the second electric motor MG2 in a decelerating state of the vehicle with the brake pedal 29 being operated, so that the amount of variation of the electric energy generated by the second electric motor MG2 during the shift-down action can be reduced. It is also noted that the vehicle operator may reduce the accelerator pedal operation amount Acc to zero after the operation of the accelerator pedal, and at the same time operate the brake pedal 29 for sudden braking. In this event, the automatic transmission 22 may be shifted up substantially simultaneously with an abrupt increase of the amount of electric energy generated by the second electric motor MG2. The above-indicated temporary inhibition of the shift-up action of the automatic transmission 22 makes it possible to shift-up the automatic transmission 22 only after the abrupt increase of the generated electric energy has been terminated.

In the drive system 10 in the illustrated embodiments as shown in FIG. 1, the ring gear R0 functioning as the output element of the planetary gear set 26 is connected to the output shaft 14. However, the ring gear R0 may be connected to the sun gear S2 functioning as the input element of the automatic transmission 22, rather than to the output shaft 14. Namely, the planetary gear set 26, second electric motor MG2, automatic transmission 22 and output shaft 14 may be connected to each other in this order of description as seen in the direction from the engine side.

In the shifting map of FIG. 5 used in the illustrated embodiments, the vehicle speed VL is taken along the horizontal axis. Since the vehicle speed VL is proportional to the output shaft speed Nout, the vehicle speed VL taken along the horizontal axis in the shifting map of FIG. 5 may be replaced by the output shaft speed Nout.

In the above-described electricity-generation-amount-variation restricting control implemented in the illustrated embodiment, the increase rate ACmg1 of the commanded value of the first electric motor speed Nmg1 is limited to the predetermined first electric motor acceleration upper limit value $LT_{AC1}$. However, the engine speed Ne changes according to the first electric motor speed Nmg1, owing to the differential function of the planetary gear set 26. In this respect, the electricity-generation-amount-variation restricting control may be modified such that the increase rate ACmg1 of the commanded value of the first electric motor speed is replaced by a rate of increase of a commanded operating speed of the engine 24.

In the illustrated embodiments, the vehicle speed VL on which the determination of the shifting action of the automatic transmission 22 is made is recognized on the basis of the output signal of the output shaft speed sensor 45. However, the vehicle speed VL may be recognized on the basis of an output signal of a drive wheel speed sensor provided to detect the rotating speed of the drive wheels 18.

It is to be understood that the present invention may be embodied with various other changes not illustrated herein, without departing from the spirit and scope of the invention.

NOMENCLATURE OF REFERENCE SIGNS

10: Drive system (Vehicular drive system)
18: Drive wheels
22: Automatic transmission
24: Engine
26: Planetary gear set (Differential mechanism)
27: Accelerator pedal
28: Electronic control device (Control apparatus)
32: Electric-energy storage device (Electric motor power source)
30: First inverter (Inverter)
44: Second inverter (Inverter)
64: Inverter smoothing capacitor
MG1: First electric motor (At least one electric motor, Differential electric motor)
MG2: Second electric motor (At least one electric motor, Vehicle driving electric motor)

The invention claimed is:

1. A control apparatus for a vehicular drive system, comprising at least one electric motor each connected through an inverter to an electric motor power source, an inverter smoothing capacitor connected to the inverter on the side of the electric motor power source for smoothing a voltage applied from said electric motor power source to said inverter, and an automatic transmission which constitutes a part of a power transmitting path between a vehicle driving electric motor of said at least one electric motor and vehicle drive wheels and which is shifted to one of a plurality of speed positions on the basis of a vehicle running state and according to a predetermined shifting map, said control apparatus implementing a torque reduction control to temporarily reduce an output torque of said vehicle driving electric motor during a shifting action of said automatic transmission, as compared with that prior to the shifting action, wherein:

an electricity-generation-amount-variation restricting region is predetermined such that a point of said vehicle running state lies in the electricity-generation-amount-variation restricting region prior to a moment of determination to perform the shifting action of the automatic transmission according to said shifting map;

an electricity-generation-amount-variation restricting control is implemented to restrict a rate of increase of a total amount of an electric energy generated by said at least one electric motor, to a predetermined upper limit value, when said point of the vehicle running state has moved into in said electricity-generation-amount-variation restricting region; and a shifting action of said automatic transmission is inhibited during a time period from a moment when said point of the vehicle running state has moved into said electricity-generation-amount-variation restricting region, up to one of: a moment when a predetermined shifting-action inhibiting time period has elapsed after the moment when said point has moved into said electricity-generation-amount-variation restricting region; a moment when an amount of variation of the electric energy generated by each of said at least one electric motor within a predetermined determination time period has been reduced below a predetermined electricity-generation-amount convergence threshold value; a moment when an amount of variation of an operating speed of each of said at least one electric motor within said determination time period has been reduced below a predetermined speed convergence threshold value; and a moment when an amount of variation of an output torque of each of said at least one electric motor within said determination time period has been reduced below a predetermined torque convergence threshold value.

2. The control apparatus according to claim 1, wherein said vehicular drive system is further provided with an engine, and a differential mechanism which constitutes a part of a power transmitting path between said engine and said vehicle drive wheels, and a differential state of which is controlled by controlling a differential electric motor of said at least one electric motor.

3. The control apparatus according to claim 2, wherein the shifting action of said automatic transmission is inhibited when said point of the vehicle running state has moved into said electricity-generation-amount-variation restricting region as a result of an operation of an accelerator pedal, and the inhibition of the shifting action of said automatic transmission is cancelled, and the shifting action of said automatic transmission is permitted, at a point of time after a moment when a rate of reduction of operating speed of said differential electric motor during regeneration of said differential electric motor has become highest after said point of the vehicle running state has moved into said electricity-generation-amount-variation restricting region.

4. The control apparatus according to claim 1, wherein said shifting map defines a shift-up boundary line for determination of shifting up said automatic transmission when said point of the vehicle running state has moved across the shift-up boundary line from a low vehicle speed area into a high vehicle speed area, and a shift-down boundary line for determination of shifting down said automatic transmission when said point of the vehicle running state has moved across the shift-down boundary line from the high vehicle speed area into the low vehicle speed area, and said electricity-generation-amount-variation restricting area consists of one or both of: a region located adjacent to and on a lower vehicle-speed side of said shift-up boundary line; and a region located adjacent to and on a higher vehicle-speed side of said shift-down boundary line.

5. The control apparatus according to claim 1, wherein said electricity-generation-amount-variation restricting control is implemented also during the shifting action of said automatic transmission.

* * * * *

UNITED STATES PATENT AND TRADEMARK OFFICE
CERTIFICATE OF CORRECTION

PATENT NO. : 8,868,274 B2
APPLICATION NO. : 13/821013
DATED : October 21, 2014
INVENTOR(S) : Shiiba et al.

Page 1 of 1

It is certified that error appears in the above-identified patent and that said Letters Patent is hereby corrected as shown below:

On the title page item [75], third Inventor's name, "Talyo Uejima" should read -- Taiyo Uejima --.

Signed and Sealed this
Second Day of June, 2015

Michelle K. Lee
*Director of the United States Patent and Trademark Office*